United States Patent [19]

Rochelle et al.

[11] Patent Number: 5,401,481
[45] Date of Patent: Mar. 28, 1995

[54] PROCESSES FOR REMOVING ACID COMPONENTS FROM GAS STREAMS

[75] Inventors: Gary T. Rochelle, Austin, Tex.; Claus Jorgensen, Elliott City, Md.; John C. S. Chang; Theodore G. Brna, both of Cary, N.C.; Charles B. Sedman, Hillsborough, N.C.; Wojciech Jozewicz, Chapel Hill, N.C.

[73] Assignee: Board of Regents, The University of Texas System, Austin, Tex.

[21] Appl. No.: 32,472

[22] Filed: Mar. 15, 1993

Related U.S. Application Data

[60] Continuation of Ser. No. 771,051, Oct. 2, 1991, abandoned, which is a division of Ser. No. 163,090, Mar. 2, 1988, Pat. No. 5,100,643, which is a continuation-in-part of Ser. No. 930,171, Nov. 10, 1986, abandoned.

[51] Int. Cl.⁶ ............................................. C01B 33/24
[52] U.S. Cl. .................................... 423/331; 106/710; 106/796
[58] Field of Search ................. 423/242, 244, 331; 106/612, 633, 706, 710, 793, 796

[56] References Cited

U.S. PATENT DOCUMENTS

| | | | |
|---|---|---|---|
| 3,131,024 | 4/1964 | Leineweber | 23/110 |
| 3,264,130 | 8/1966 | Mays et al. | 106/292 |
| 3,501,324 | 3/1970 | Kubo | 423/331 |
| 3,695,836 | 10/1972 | Yang | 423/331 |
| 3,861,935 | 1/1975 | Ohnemuller et al. | 106/306 |
| 3,906,079 | 9/1975 | Tamaki et al. | 423/242 |
| 3,928,539 | 12/1975 | Satoh et al. | 423/326 |
| 3,988,419 | 10/1976 | Mori | 423/155 |
| 4,073,864 | 2/1978 | Atsukawa et al. | 423/242 |
| 4,110,088 | 8/1978 | Cold et al. | 55/90 |
| 4,226,831 | 10/1980 | Dilworth | 422/173 |
| 4,276,224 | 6/1981 | Schlager et al. | 423/244 |
| 4,279,873 | 7/1981 | Felsvang et al. | 423/242 |
| 4,305,909 | 12/1981 | Willett et al. | 422/169 |
| 4,314,980 | 2/1982 | Shen et al. | 423/331 |
| 4,344,920 | 8/1982 | Isserlis | 422/169 |
| 4,432,804 | 2/1984 | Tamura et al. | 106/306 |
| 4,481,170 | 11/1984 | Wier, Jr. | 422/168 |
| 4,533,522 | 8/1985 | Leimkühler | 422/170 |
| 4,555,392 | 11/1985 | Steinberg | 423/244 |
| 4,602,918 | 7/1986 | Steinberg et al. | 44/51 |
| 4,620,856 | 11/1986 | Rosenberg et al. | 55/73 |
| 4,629,508 | 12/1986 | Cain, Jr. et al. | 106/85 |
| 4,629,721 | 12/1986 | Ueno | 502/411 |
| 4,636,370 | 1/1987 | Dean et al. | 423/235 |
| 4,636,371 | 1/1987 | Farha, Jr. | 423/244 |
| 4,640,825 | 2/1987 | Rosenberg | 423/235 |

(List continued on next page.)

FOREIGN PATENT DOCUMENTS

| | | |
|---|---|---|
| 62-2213842 | 9/1987 | Japan . |
| 396969 | 8/1933 | United Kingdom . |
| 2106087 | 4/1983 | United Kingdom ............ 423/331 |

OTHER PUBLICATIONS

"Flue Gas Desulfurization," Joy Manufacturing Company Brochure, printed Jun., 1972.

(List continued on next page.)

*Primary Examiner*—Olik Chaudhuri
*Assistant Examiner*—Ken Horton
*Attorney, Agent, or Firm*—Arnold, White & Durkee

[57] ABSTRACT

The present disclosure relates to improved processes for treating acid gases to remove acid gas components therefrom. Processes in accordance with the present invention include preparing a calcium silicate hydrate sorbent in the form of a semi-dry, free-flowing powder, and treating the gas with the powdery sorbent, such as by injecting the sorbent into a stream of the gas. The powdery sorbents may be prepared by slurrying/drying or pressure hydration techniques. Examples disclosed herein demonstrate the utility of these processes in achieving improved acid gas-absorbing capabilities in both lab-scale and pilot plant studies. Additionally, disclosure is provided which illustrates preferred plant design configurations for employing the present processes using conventional dry sorbent injection equipment. Retrofit application to existing plants is also addressed.

5 Claims, 7 Drawing Sheets

U.S. PATENT DOCUMENTS

| | | | |
|---|---|---|---|
| 4,642,225 | 2/1987 | Leikert | 423/244 |
| 4,645,449 | 2/1987 | Schwartz et al. | 431/8 |
| 4,645,652 | 2/1987 | Kimura | 423/235 |
| 4,645,653 | 2/1987 | Kimura | 423/235 |
| 4,645,654 | 2/1987 | Barczak | 423/244 |
| 4,719,088 | 1/1988 | Ito9h et al. | 422/106 |
| 4,804,521 | 2/1989 | Rochelle et al. | 423/242 |
| 4,867,955 | 9/1989 | Johnson | 423/244 |
| 5,047,221 | 9/1991 | Jocewicz et al. | 423/242 |
| 5,047,222 | 9/1991 | Rochelle et al. | 423/242 |

OTHER PUBLICATIONS

Jozewicz et al. (1987) Proceedings: Tenth Symposium on Flue Gas Desulfurization Atlanta, Ga., Nov. 1986, vol. 2, pp. 9–123 through 9–144.

Jozewicz et al. (1986), *Environ. Prog.*, 5:218.

J. He et al., "Comparison of Tuff and Fly Ash in Blended Cement", 64 *Am. Ceram. Soc. Bulletin*, No. 5 (1985), at 707–711.

G. D. Reed et al., "Analysis of Coal Fly Ash Properties of Importance to Sulfur Dioxide Reactivity Potential", 18 Environ. Sci. Technol., No. 7 (1984), at 548–552.

S. L. Marusin, "Experimental Examination of Fly Ash Concrete", 6 Cement, Concrete, and Aggregates, CCAGDP, No. 6 (Winter 1984), at 126–136.

M. W. Grutzeck et al., "Mechanism of Hydration of Condensed Silica Fume in Calcium Hydroxide Solutions" (1984), at 643–664.

P. J. Sereda et al., "Structure formation and development in hardened cement pastes" (1980).

Yang et al. (1979), *AIChE J.*, 25:811.

F. A. Ayer, "Proceedings: Symposium on Flue Gas Desulfurization Hollywood, Fla., Nov. 1977 (vol. 1)", EPA-600/7-78-058a (Mar. 1978) at 278:291.

H. F. W. Taylor, "Chapter 5: The calcium Silicate Hydrates", 1 The Chemistry of Cements 167–232 (1964).

S. Brumauer, "Tobermorite Gel—The Heart of Concrete", 50 American Scientist 210–229 (1962).

S. A. Greenberg et al., "Investigation of Colloidal Hydrated Calcium Silicates. I. Solubility Products", 64 *J. Phys. Chem.* 1151–1157 (Sep. 1960).

L, Kalousek, "Tobermorite and Related Phases in the System $CaO-SiO_2-H_2O$", *J. Amer. Concrete Inst.* (Jun. 1955), at 989–1011.

L. Heller et al. "Hydrated Calcium Silicates. Part II. Hydrothermal Reactions: Lime:Silica Ration 1:1", *Chemical Society Journal* (1951), at 2397–2401.

H. F. W. Taylor, "Hydrated Calcium Silicates. Part I. Compound Formation at Ordinary Temperatures", *Chemical Society Journal* (1950) at 3682–3690.

H. H. Steinour, "The System $CaO-SiO_2-H_2O$ and the Hydration of the Calcium Silicates", *Chem. Reviews* (1947), at 391–459.

A. B. Cummins et al. "Diatomaceous Earth: Equilibrium and Rate of Reaction in the System Hydrated Lime–Diatomaceous Silica–Water" 26 Industrial and Engineering Chemistry, No. 6 (1934), at 688–693.

G. Rochelle and P. Chu, "$SO_2/NO_2$ Removal By $Ca(OH)_2$" (Oct. 16, 1986).

J. Peterson, "Kinetic Study of the Reaction: Fly Ash+$Ca(OH)_2$"(Oct. 21, 1986).

J. Peterson and G. Rochelle, "Kinetic Study of the Reaction: $Ca(OH)_2$+Fly Ash" (Apr. 14, 1987).

J. Peterson and G. T. Rochelle, "Calcium Silicate Reagents for Dry Flue Gas Desulfurization" (Oct. 14, 1987).

(Example I - Baghouse)
(Example IV - Cyclone)

(Example II & III - Baghouse)
(Example V - Cyclone)

(Example VI & VII - Cyclone)

(Example VIII)

PROCESSES FOR REMOVING ACID COMPONENTS FROM GAS STREAMS

The government may own certain rights in the present invention pursuant to EPA Contract 68-023988.

This application is a continuation of application Ser. No. 07/771,051, filed Oct. 2, 1991, now abandoned, which is a division of U.S. Ser. No. 07/163,090, filed Mar. 2, 1988, now U.S. Pat. No. 5,100,643, which is a continuation-in-part of U.S. Ser. No. 930,171, filed Nov. 10, 1986, now abandoned, the disclosure of which is incorporated herein by reference.

BACKGROUND OF THE INVENTION

1. Field of the Invention

The present invention relates to processes for reducing the level of acid gas components (e.g. sulfur oxides) from acid gases. In particular, the invention relates to use of semi-dry calcium silicate hydrates in the form of free-flowing powders for removal of sulfur oxides ($SO_2/SO_3$) and/or other acid gases such as hydrogen chloride (HCl), hydrogen fluoride (HF) and hydrogen bromide (HBr) from flue gases resulting from combustion of solid/liquid fuel or waste.

2. Description of the Related Art

Coal represents one of the most bountiful sources of energy in the world today. For example, it has been estimated that the known coal reserves in the U.S. alone could supply sufficient energy for domestic consumption for several hundred years. Unfortunately much of this coal contains high levels of sulfur which, when the coal is burned, is released into the atmosphere, generally in the form of sulfur dioxide. One of the most serious environmental problems associated with such sulfur emissions is the generation of atmospheric sulfuric acid, resulting in so-called "acid rain."

Attempts at controlling sulfur dioxide emissions from coal burning plants have led to the development of a number of advanced systems and processes for flue gas desulfurization. Fluidized-bed combustion, furnace lime injection, and flue gas desulfurization are some of the examples. In these processes, limestone and/or lime has been used as a sorbent which forms primarily calcium sulfate at a temperature above 700° C.

Fluidized bed combustion (FBC) and scrubbers for flue gas desulfurization (FGD) represent two of the more promising advanced processes for power generation. FBC relates to the combustion of coal with limestone particles as the bed material, and has received increasing attention as a promising and versatile technology for clean power generation. Equally promising has been FGD, wherein sulfur-reactive sorbents are employed to remove sulfur from flue gases prior to their venting into the atmosphere. In developing the technologies for FBC and FGD, a search for sorbents more effective than limestone and/or lime, especially ones which are amenable to recycle, has been a challenging task.

Flue gas desulfurization by the means of spray dryer absorber and bag filter or electrostatic precipitator has recently received much attention. In the spray dryer/bag filter system, flue gas is contacted with a fine spray of an aqueous solution or slurry of a reactive alkali (typically lime), with $SO_2$ removal and drying occurring simultaneously. The sulfur dioxide is absorbed into the water droplet during the constant rate period of drying until it shrinks to the extent that the particles touch each other. During the following falling rate period, the remaining water diffuses through the pores of agglomerated particles until the solids establish pseudo-equilibrium with the humid environment of spray dryer.

The third stage of drying may be called the second-falling rate period. Any drying/mass transfer during this period is limited by the diffusion of moisture from within tightly packed particles. The first two stages take place exclusively in the spray dryer. The majority of pseudoequilibrium period occurs in the duct joining spray dryer and bag filter and in the bag filter itself. Since not all moisture is removed from the solids in the spray dryer, the remaining moisture promotes further removal of $SO_2$ in the bag filter. Therefore the total $SO_2$ removal in the system is a sum of removal in the spray dryer and bag filter.

The recycle of product solids is among the options that have been tested to increase the utilization of reagent. Numerous reports indicate that recycle of product solids and fly ash results in substantial improvement of reagent utilization and $SO_2$ removal. This option provides a higher $Ca(OH)_2$ concentration in the slurry feed at the same $Ca(OH)_2$ stoichiometry (moles of $Ca(OH)_2$ fed to the system/moles of $SO_2$ in the feed gas). In one pilot plant, increasing the recycle ration (g solids recycled/g fresh $Ca(OH)_2$) from 6:1 to 12:1 increased $SO_2$ removal in the spray dryer from 70% to 80% at stoichiometry 1.0 (Blythe et al., 1983, *Proceedings: Symposium or Flue Gas Desulfurization*, Vol. 2, NTIS PB84-110576). In another installation, recycle tests gave 10 to 15% more $SO_2$ removal at stoichiometry 1.5 (Jankura et al., presented at the *Eighth EPA/EPRI Symposium on Flue Gas Desulfurization*, New Orleans, La., 1983).

Another option enhancing lime utilization uses the recycle of both solids captured downstream in the spray dryer and solids from the baghouse. However, removal does not appear to be significantly different when either spray dryer solids or fabric filter solids are employed as the recycled material. At stoichiometry 1.0 the removal increased from 53% when no recycle was employed to 62% with 0.5:1 recycle ration. When ash content in the feed slurry increased from 5% to 20%, $SO_2$ removal in the spray dryer increased from 80% to 92% for stoichiometry 1.6 (Jankura et al., 1983).

U.S. Pat. No. 4,279,873, to Felsvang et al., relates several experiments investigating the effects of fly ash recycle and proved it to be beneficial for $SO_2$ removal in a spray dryer. It was found that substantially higher removal of $SO_2$ may be achieved when recycling the fly ash and $Ca(OH)_2$ than when recycling $Ca(OH)_2$ alone. Corresponding efficiencies for stoichiometry 1.4, 500 ppm inlet $SO_2$, and comparable solids concentration were 84% and 76%, respectively. For the same stoichiometry and $SO_2$ concentration, removal was only 67% for the simple once-thru process. At low $SO_2$ concentration and high recycle ratios, over 90% removal was achieved even at extremely low stoichiometries. At 548 ppm $SO_2$, 25:1 recycle, 0.76 stoichiometry and at 170 ppm $SO_2$, 110:1 recycle, 0.39 stoichiometry, $SO_2$ removal was 93.8% and 97.8%, respectively.

Removal efficiencies up to 65% were reported with a slurry of highly alkaline (20% CaO) fly ash only (Hurst and Bielawski, *Proceedings: Symposium on FGD*, EPA-600/981-019b, 853–860, 1980). In another experiment, 25% $SO_2$ removal was achieved when spraying slurried fly ash collected from a boiler burning 3.1% sulfur coal (Yeh et al., Proceedings: Symposium on Flue Gas Desulfurization, EPRI CS-2897, 821–840, 1983). A weak trend was found in a study of 22 samples of fly ashes that a slurry with a higher total slurry alkalinity tended to have a higher $SO_2$ capture (Reed et al., *Environ. Sci. Technol.*, 18, 548–552, 1984).

Flue gas desulfurization by dry injection of a calcium-based sorbent such as lime into the flue gas downstream of economizer or air preheater has been a very attractive concept because of its technical simplicity and low capital cost requirement. In the dry injection procedures known in the art, lime powder, when used as sorbent, has to be very dry (i.e., containing less than about 5% water by weight) to stay in the free-flowing state for solids handling and dry injection. If the moisture content of the lime is increased above this level, it becomes a wet, sticky lime having a tendency to cake and cause soaling and plugging problems. However, the dry lime sorbent is not reactive toward $SO_2$ unless the surface moisture is increased. Thus, for effective $SO_2$ removal using a dry lime sorbent, the flue gas must typically be humidified by evaporation of atomized water droplets, thereby increasing the moisture content and the sorbent reactivity.

A large vessel may be required to provide adequate mixing and residence time to achieve sufficient flue gas humidification. Without such a vessel, water evaporation would be limited and the resulting duct scaling and plugging would present problems in operation. It should be noted that even after the flue gas is adequately humidified for efficient $SO_2$ removal (to an approach to saturation temperature of 5° to 30° C.), the reactivity of injected lime is still low. Usually less than 20% utilization of the lime injected as expected, thereby wasting more than 80% of the sorbent. Therefore, there is a need for a reactive sorbent which can be handled by conventional dry solids injection equipment and yield high utilization.

Calcium silicate hydrates have heretofore presented problems when used as a sorbent for spray drying methods of flue gas desulfurization. As a relatively high humidity (5° to 30° C. approach to saturation temperature) has to be maintained in the spray dryer for effective desulfurization, and the hydrates cannot be adequately dried at high humidity (probably due to their water retention characteristics and agglomerating tendencies when slurried), operating problems such as wet deposition and scaling in the spray dryer vessel typically occur.

Calcium silicate hydrates have been shown to be a reactive sorbent for $SO_2$ removal when injected dry into a pre-humidified flue gas stream. However, the sorbent preparation procedure for dry injection involves drying a calcium silicate slurry to produce the dry sorbent, which is a very energy intensive process. Therefore, there is a need to improve the sorbent preparation process to reduce or eliminate the drying requirement and decrease the production cost.

In the foregoing discussion, emphasis has been upon $SO_2$ removal for several reasons: (1) sulfur oxides are one of the more difficult acid gases to control, and (2) sulfur oxide emissions nationwide are substantially greater than other acid gases. Generally, in order of decreasing reactivity toward alkali materials, the acid gases (compounds which exhibit acid behavior when mixed with water) are (HF/HBr/HCl $SO_3$), $SO_2$, $CO_2$, $NO_2$. Thus, it is believed that for any acid gases which are more reactive than $SO_2$, the potential for significant control by calcium silicates is at least as great as for $SO_2$. Hence, the remaining discussions will refer to acid gases meaning any individual gas, or combination of gases, which are as reactive or more reactive than $SO_2$.

SUMMARY OF THE INVENTION

Accordingly, the present invention is directed to processes for reducing the level of acid gas components (e.g. $SO_2$, $SO_3$, HCl, HF, and HBr) in a combustion exhaust gas, using an improved sorbent which reduces sorbent drying requirements and the need to pre-cool and/or pre-humidify the gas.

It has been found that the very low utilization (i.e., less than about 20%) of lime normally obtained in a dry $SO_2$ removal process can be overcome by making use of prepared calcium silicate hydrates. The term "calcium silicate(s)" is used herein to refer to a material which is prepared by mixing a material containing calcium with a material containing calcium-reactive silica, and heating the mixture to a temperature above ambient. It is believed that the calcium silicates used in the present invention have a high surface area and sufficient pore volume characteristics to give them a unique ability to retain a high surface moisture content and still handles as a dry powder. The semi-dry hydrates are free-flowing solid particles and can be handled by conventional dry solids handling apparatus and dry injection equipment. The term "semi-dry" refers to a powdery substance generally containing about 5% to about 50% water by weight but visually appearing dry, and the term "free-flowing" means a substance that can be used with conventional dry injection equipment without caking or causing scaling and plugging problems. Thus, a free-flowing powdery substance consists of particles which generally do not agglomerate to the point of restricting flow when conveyed in contact with one another. Alternatively, a free-flowing powdery substance is intended to refer to one that has a reduced resistance to flow such that it will remain entrained in the gas stream without accumulating in the duct work or depositing on duct work walls when employed to removed acid components from the gas. The free-flowing powder of the present invention thus has a low tackiness or agglomerative index which results in a decreased energy of conveyance. Using the water retaining characteristics, an effective calcium silicate hydrate sorbent can be prepared for use with dry injection processes in a manner which reduces expensive sorbent drying and gas humidification requirements.

In one embodiment of the present invention, such a process is provided which includes the steps of preparing a semi-dry, free-flowing powdery substance comprising a mixture of a calcium silicate and water. A flue gas is contacted with the powdery substance in a manner sufficient to allow for absorption of the acid components by the calcium silicate. The calcium silicate is separated from the gas in the form of spent solids, which solids preferably have a water content of between about 2% and 20% by weight. Preferably, the powdery sorbent has a water content of between about 5% and 50% by weight, with a more preferred water content of between about 10% and 35% by weight. Also, the sorbent preferably has a mass ratio of calcium to silica between about 1:10 and 1:1, with a more preferred ratio of 1:3 to 1:1.

The reactivity of the calcium silicate produced may be enhanced by addition of sodium hydroxide, phosphoric acid, or salts such as sodium chloride, calcium chloride, calcium nitrate, ammonium phosphate, sodium phosphate or sodium nitrate. Thus, the sorbent may, according to the present invention, contain one or more of these additives.

Without being bound by theory, the inventors postulate that salt additives such as $CaCl_2$, $CaNO_3$ and $NaNO_3$ enhance reactivity by acting as deliquescent agents that increase the amount of absorbed water on the surface of semi-dry solids. NaCl is also effective, but is not an effective deliquescent agent, so this mechanism may not be correct. These salt additives seem to require 40 to 80% relative humidity (RH). Work conducted on behalf of the present inventors has shown that 10 mole % NaCl enhances reagent $Ca(OH)_2$ conversion from 12% to 30% at 54% RH.

NaOH enhances the reactivity of lime/fly ash materials to $SO_2$ and $NO_x$. The inventors theorize that NaOH enhances dissolution of the fly ash, serves as a deliquescent agent, and provides some additional alkali for $SO_2/NO_x$ absorption. Effective $NO_x$ removal requires higher temperature (90°–110° C.) and longer contact time (thus requiring a bag filter). Addition of $Na_2CO_3$ should have the same effect as NaOH since it reacts with $Ca(OH)_2$ to give NaOH.

Soluble additives can increase the environmental impact of waste solids by causing leaching, although coprecipitation and formation of insoluble solid phases may immobilize what would otherwise be insoluble solids.

Sorbent Preparation

As provided by the present invention, the semi-dry sorbent is generally obtained either by (1) preparation of an aqueous calcium silicate slurry, and reducing the water content of the slurry, or (2) pressure hydration of calcium silicate.

The calcium silicate hydrates used in the present invention are prepared as an aqueous mixture of a calcium containing material such as lime, and a calcium-reactive silica containing material such as flyash or spent solids. The term "spent solids" refers to sorbent injected into acid gas absorbing systems and collected after absorption of acid gas components. The spent solids produced in accordance with the processes provided by the present invention may be recycled to prepare more sorbent, thus providing a continuous process. Other calcium sources suitable for use with the present invention include, for example, dolomitic or calcitic limestone, or seashells. Likewise, other suitable silica sources include clay, silicic acid, diatomaceous earth, quartz, activated alumina, or steel or aluminum manufacturing wastes.

When the mixing temperature is maintained below 100° C., the calcium silicate may exist in a slurry form at the end of the hydration process. This slurry typically contains 60–75% water by weight. Water can be removed from the slurry in various ways to produce the semi-dry sorbent. For example, spent or recycled solids can be mixed with the slurry in a simple solids mixer resulting in a free-flowing semi-dry powder. Preferably, between about 1.5 and 2 pounds of spent solids are mixed with every pound of slurry. However, as should be appreciated, this ratio can be altered depending upon the moisture content of the slurry and spent solids, and the desired moisture content of the sorbent product. Furthermore, the slurry can be filtered to remove a portion of water therefrom, producing a filter cake or paste. The paste can then be dried to produce the powdery sorbent. Alternatively, the slurry or filter cake can be thermally dried (e.g., spray or oven-dried) to the desired moisture content.

When the mixing temperature for the calcium silicate preparation is maintained above 100° C. in a pressurized mixer, a semi-dry sorbent can be generated by the steam release (pressure release) at the end of hydration. By controlling the amount of water added to the pressure hydrator during sorbent preparation, the moisture content of the end-product can be regulated and a semi-dry, free-flowing sorbent is produced.

When pressure hydration is used for sorbent preparation, the preferred operating conditions as provided by the present invention are a pressure between about 1 and 10 atm, and a temperature between about 100° and 180° C., with a most preferred operating temperature of 140° to 160° C. During hydration, the calcium silicate can be maintained in a free-flowing powdery state during hydration and released from the hydrator as a semi-dry product. Alternatively, however, the calcium silicate can be hydrated with a sufficient amount of water to produce an aqueous slurry product from the hydrator, and the slurry can subsequently be dried to produce the free-flowing powdery sorbent. The slurry can be dried by release of pressure (e.g., by flashing off pressure following the preparation of the sorbent), or by other techniques described herein.

Sorbent Utilization

It has been found that when the semi-dry calcium silicate hydrates are used as the sorbent for dry injection processes, high $SO_2$ removal and sorbent utilization can be achieved and, at the same time, the flue gas prehumidification requirements can be substantially reduced or even eliminated. It is believed that this is achieved by the large surface area and the associated high moisture content of the injected semi-dry sorbent.

Thus, in accordance with the present invention, the semi-dry, free-flowing sorbent is contacted with the flue gas to allow for absorption of the acid gas components by the calcium silicate. Preferably, this is effected by injecting the powdery sorbent into a stream of the gas. If desired, the gas may be cooled and/or humidified before injection to increase sorbent reactivity. Alternatively, the contacting step may be accomplished by fluidizing a bed of the sorbent with the flue gas. In either case, the sorbent is preferably provided in an amount between about 0.5 to 3.0 moles of calcium in the sorbent for every mole of acid gas components to be removed from the gas.

Traditional calcium-based sorbents are typically not reactive toward $SO_2$ unless their moisture contents are increased. It is believed that the reactivity of the semi-dry sorbent prepared in accordance with the present invention is much higher than that of lime due to its high surface moisture content. The reactivity of the semi-dry sorbent is also believed to be enhanced by the high surface area and associated moisture developed during the calcium silicate hydration process. The inventors theorize that the high surface area provides a large number of active sites for gas/solid reaction and reduces the resulting product layer thickness and the corresponding diffusion resistance, thereby making the semi-dry sorbent very reactive toward sulfur oxides and other acid gases.

It is believed that the reason for the reduced humidification requirement is that the moisture of the semi-dry sorbent evaporates after the dry injection step and the flue gas is humidified by the evaporative cooling process. When the flue gas temperature at the dry injection point is below about 100° C., which may be achieved by an efficient economizer or air preheater, the moisture evaporated from the semi-dry sorbent may often be sufficient to achieve the humidification of the flue gas required for efficient SO$_2$ removal, and any separate flue gas humidification (e.g. by water atomization) step can be eliminated. The advantage of introducing the water for evaporative cooling with the sorbent as surface moisture rather than as a separate water spray is that this preferred process requires a far less sophisticated flue gas humidification device or none at all, as compared to that used with dry sorbents. Furthermore, as should be appreciated, the sorbent moisture evaporation is a useful phenomenon in practice because it may produce dry spent solids which can be used for recycle mixing with calcium silicate slurries to generate more semi-dry sorbent.

DETAILED DESCRIPTION OF THE INVENTION

The CaO—SiO—Al$_2$O$_3$—H$_2$O Sulfur Absorption System

Figure 1:
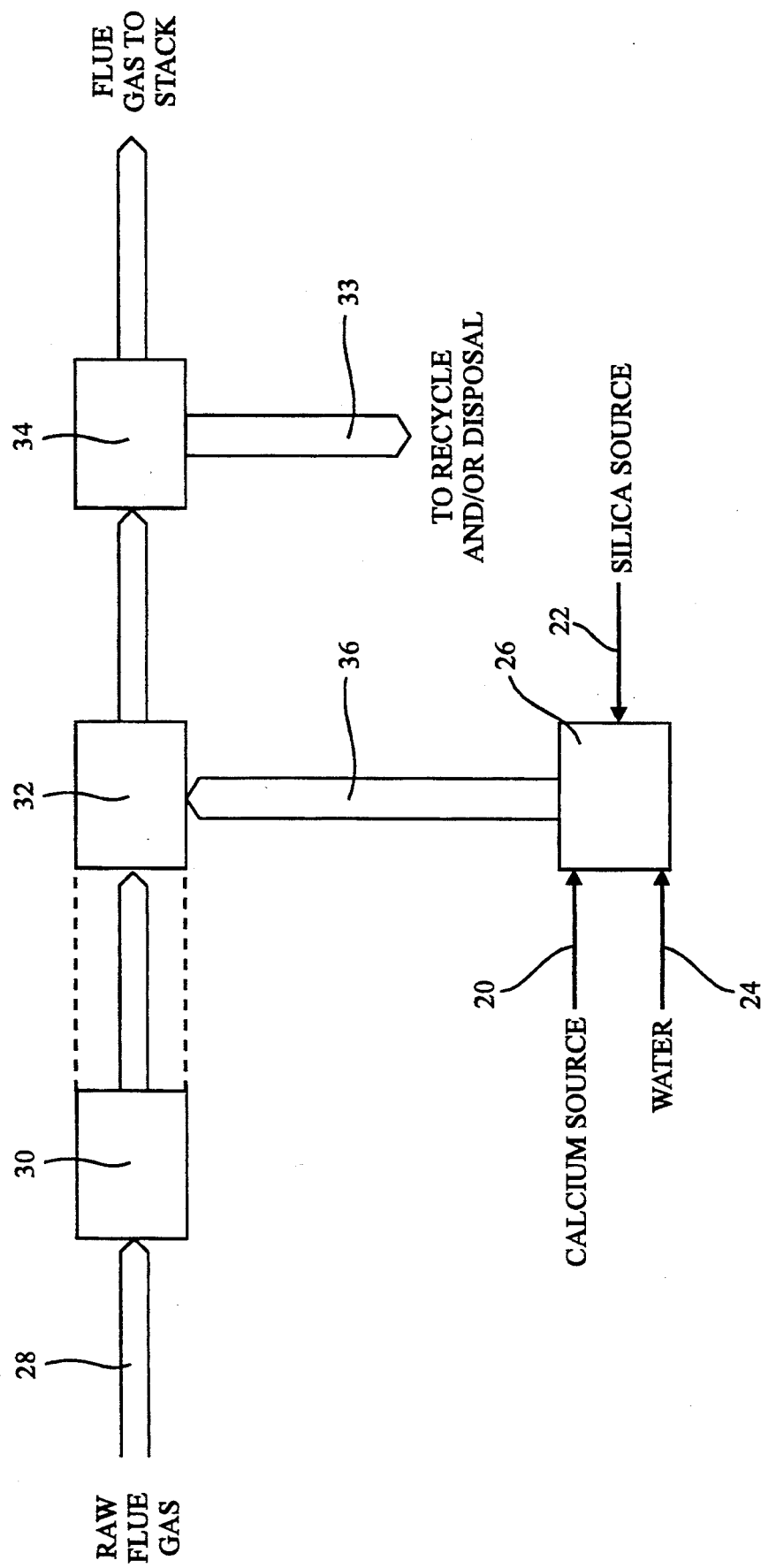
FIG. 1. Schematic diagram of the general process provided by the present invention.

The nature of calcium silicate hydrate and calcium aluminate hydrate as well as calcium aluminate silicate hydrate formation in CaO—SiO$_2$—Al$_2$O$_3$—H$_2$O systems is very complicated. It is usually impossible to assign a simple chemical formula to it, especially at ordinary temperatures of interest in flue gas desulfurization. At temperatures from 20° C. to about 100° C., two main calcium silicate hydrates are formed, mono- and dicalcium silicate hydrates. Their ratio appears to depend on the initial ratio of calcium to silica in the slurry. Both monocalcium calcium silicate hydrate-CaOxSiO$_2$xH$_2$O- and dicalcium silicate hydrate-(CaO)$_2$xSiO$_2$x-H$_2$O- are fibrous gels of specific surface areas in the range of 100–300 m$^2$/g. At 20°–100° C. after 8 hours of hydration, tobermorites (calcium silicate hydrates) may crystallize, also of high surface area.

The reaction of fly ash and Ca(OH)$_2$ in the presence of water is called a pozzolanic reaction. A pozzolan is a siliceous or siliceous and aluminous material which in itself possesses little or no cementitious value but will, in finely divided form and in the presence of moisture, chemically react with calcium hydroxide at ordinary temperatures to form compounds possessing cementitous properties. Due to small particle size and generally noncrystalline character, fly ash usually shows pozzolanic properties, or pozzolanic and cementitious properties in case of high-calcium ashes. High-calcium fly ash contains tricalcium aluminate hydrate, which is the most reactive mineral present within portland cement. Pozzolanic reactions give products with cementitious properties and with high surface area that can enhance SO$_2$ removal.

Pozzolan originated as a mortar of lime and ash (from Pozzouli, Italy) which the Romans used for stone constructions. The definition of pozzolanic reaction implies that spray dryer off-products, fly ashes, clays, and sands should be able to provide components to form calcium silicate hydrates, calcium aluminate hydrates, calcium alumino-ferrite hydrates, calcium sulfo-aluminate hydrates (ettringites), and calcium sulfo-aluminate-ferrite hydrates. However, not all siliceous and aluminous minerals are pozzolans. Crystalline minerals (mullite, silica as quartz) do not react with lime, especially at ordinary temperatures. Siliceous and/or aluminous materials must be non-crystalline and in small particles, in order to provide silica and alumina, after hydration in alkaline solutions, to form cementitious products. These reactions are the ones which constituents of portland cement undergo in the presence of water. The hydration reaction of aluminates in the presence of gypsum and lime and reaction of calcium silicates are as follows:

$$3CaO\ Al_2O_3 + 3CaSO_4\ 2H_2O + aq \longrightarrow$$

$$6CaO\ Al_2O_3\ 3SO_3\ 32H_2O\ \text{and}\ 6CaO\ Al_2O_3\ Fe_2O_3\ 3SO_3\ 32H_2O +$$

$$CaSO_4 + aq \longrightarrow 4CaO\ Al_2O_3\ SO_3\ 18H_2O\ \text{and}$$

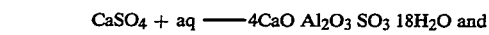

$$4CaO\ Al_2O_3\ Fe_2O_3\ SO_3\ 18H_2O +$$

$$Ca(OH)_2 + aq \longrightarrow 4CaO\ Al_2O_3\ 19H_2O\ \text{and}$$

$$4CaO\ Al_2O_3\ Fe_2O_3\ 19H_2O\ 3CaO\ SiO_2\ \text{and}$$

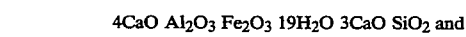

$$2CaO\ SiO_2 + aq \longrightarrow CaO\ SiO_2\ H_2O + Ca(OH)_2$$

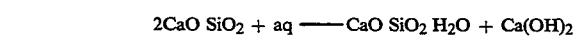

Typical portland cement consists of 50% tricalcium silicate, 25% dicalcium silicate, 10% tricalcium aluminate, 9% calcium alumino-ferrite, and 6% calcium sulfate. Tricalcium silicate appears to be the most reactive mineral present within the portland cement. The main product of hydration of portland cement's silicate materials is calcium silicate hydrate of colloidal dimensions. All calcium silicate hydrates are fibrous gels in early stage of formation and their surface area is in the range of 100–300 m$^2$/g. Moreover, Tobermorite gel plays a vital role in establishing the strength of concrete.

When considering the semi-dry injection system, typically one is dealing with fly ash as a source of silica instead of amorphous silica. The solubility of quartz particles of 3–15 um diameter in water is 11 ppm at 25°

C. and 60 ppm at 100° C. The corresponding values for amorphous silica are 130 ppm and 420 ppm, respectively. Temperature and pH have strong effects on the solubility of amorphous silica. When pH was adjusted with NaOH up to 10.5 from 7 at 25° C., solubility was found to increase to 1000 ppm. Above a pH of 10.7, all the solid phase of amorphous silica dissolves to form soluble silicate. Therefore it would be reasonable to expect the dissolution of fly ash to be the limiting step in the formation of calcium silicate hydrates. Because of the lower solubility of fly ash, the specific surface area of the $Ca(OH)_2$/silica reaction product is smaller than values reported for laboratory studies with amorphous silica. Also, it is not clear whether the development of the specific surface area of the product of hydration (for a given ratio of $Ca(OH)_2$/fly ash) increases proportionally to the amount of conditioned lime.

Because of low fly ash reactivity it is often desirable to know the exact characteristics of fly ash to be used. Usually fly ashes are divided into two categories: low-calcium (containing less than 5% of analytical CaO) from burning bituminous or anthracite coals and high-calcium (up to 35% Ca) from burning lignite or subbituminous coals. However, from the point of perspective reactivity and formation of calcium silicate hydrates, it is generally more important how much more amorphous material there is within the fly ash as compared with crystalline substances. Higher contents of crystalline phases (alpha-quartz, mullite, sillimanite, hematite, magnetite) lowers the reactivity of fly ash. Low-calcium fly ashes consist mainly of aluminosilicate glass due to the high proportions of silica and alumina. However, some crystallization takes place in the boiler when fly ash is cooling and, as a result, crystalline phases are detected under glass.

For high-calcium fly ash it appears that the glass structure is different. It has been postulated that it is composed of significant amounts of CaO & $Al_2O_3$, which is known to be highly reactive. Since the non-crystalline component comprises sometimes as much as 80% of high-calcium fly ash it seems that the reason for high reactivity of high-calcium fly ash may be in the composition of glass. On the other hand, higher contents of unburnt carbon in the low-calcium fly ash may add to its reactivity. These carbon particles are usually of high internal surface area and may bind water and admixtures when the fly ash is slurried.

In a study of surface area and porosity of fractionated fly ash from burning low-sulfur, high-ash coal, the largest fraction (>125 um) had a surface area of 9.44 $m^2/g$ whereas the finest fraction (>7 um) had a surface area of 1.27 $m^2/g$. Since large particles constitute a small fraction of fly ash only, the above effect is relatively insignificant. Industrial experiments should outperform laboratory tests, since it has been found that high-calcium fly ash passed the lime pozzolanic activity test when commercial source of lime was used, but failed to do so in the presence of a reagent grade $Ca(OH)_2$. This effect is possibly the result of impurities in lime which have formed poorly-crystallized hydrates.

The prospect of having calcium silicate hydrates in the semi-dry injection system therefore appears to be very attractive since they have high surface area and are highly hydrated and therefore should offer high $SO_2$ removal potential. The formation would take place in the recycle system, specifically in the reactant tank. During fly ash recycle in dry flue gas desulfurization systems, reaction of fly ash with makeup $Ca(OH)_2$ probably takes place in several steps. First lime would be dissolved, then silica and alumina—originally contained within the fly ash—would be digested and, by the means of providing favorable slurrying conditions, calcium silicate/aluminate hydrates would be formed.

A generalized flowsheet including the major embodiments of the process according to the present invention, is shown in FIG. 1. The sorbent may be prepared by mixing a calcium source 20 and a calcium-reactive silica source 22 with water 24 in a mixing device 26 at a temperature above ambient to facilitate in the formation of calcium silicate. The calcium source is preferably lime, and can be either hydrated lime ($Ca(OH)_2$) or quicklime (CaO). Preferably, for economical consideration, the silica source 22 is flyash, or recycled spent solids ("recycle solids") 33 collected from the treated flue gas stream by the particulate collection device 34. Raw flue gas 28, which may be humidified and/or cooled in, for example, an evaporative cooler 30, is contacted with the sorbent 36 prepared from the mixer 26. The contacting step is preferably accomplished by injecting the semi-dry, free-flowing sorbent 36 into a stream of the gas 28 flowing through ductwork 32. The sorbent 36 absorbs the acid gas components in the flue gas 28 as it passes to a particulate collection device 34. The treated flue gas is vented, and the sorbent is collected as spent solids 33 to be recycled and/or disposed.

When quicklime is used as the calcium source, the primary mixing device 26 is preferably a conventional hydrator or slaker operating for 30 minutes to 48 hours in the temperature range of approximately 75°–95° C., or a pressure hydrator preferably operating for 10 minutes to 2 hours in the temperature range of 140°–160° C. When hydrated lime is used as the calcium source, the mixing device 26 is preferably an agitated and heated slurry tank maintained for 30 minutes to 48 hours at a temperature in the approximate range of 75°–95° C.

The sorbent used in the processes provided by the present invention is ultimately employed in the form of a semi-dry, free flowing powder, and not in a slurry form. When any of the above-described mixing processes would produce a slurry, the sorbent is dried in accordance with the present invention to convert it into a handleable powder. For example, additional spent solids may be secondarily mixed with the slurry to produce a free-flowing powder. Preferably, 1.5 to 2 parts of additional solids are mixed with each part of slurry. A filtration step might also be used to remove a portion of water from and convert the slurry into a filter or cake prior to the secondary mixing step. This mixing process could be performed in a device of a design similar to or differing from the mixer 26 used during the primary mixing step, as described above. The preferred embodiment employs a ribbon blender unit or a mechanical fluidizer/turbulent mixer type of unit capable of mixing a slurry with a dry powder to produce a completely mixed phase or semi-dry sorbent of uniform composition. The sorbent will typically have a uniform moisture content, preferably in the range of 10–35%. Such a sorbent is well suited for handling as a semi-dry powder in most existing dry injection and solids handling equipment.

In order for a calcium silicate sorbent to remove significant amounts of sulfur dioxide after injection into a flue gas stream, the approach to saturation of the flue gas is preferably in the range of approximately 5°–30° C. As flue gases from the combustion of coal normally are about 40° to 100° C. above the adiabatic saturation temperature, they typically must be cooled and/or humidified prior to the injection of the sorbent. This can be accomplished, for example, indirectly in a heat exchanger, which would lower the flue gas temperature without an increase in the absolute humidity, or in an evaporative cooling device, which near-adiabatically lowers the temperature by water evaporation, thereby increasing the absolute humidity of the flue gas. In both cases, a lowering of the approach to saturation is achieved.

However, in accordance with the processes of the present invention, the approach to saturation of the gas prior to contact with the sorbent need not be lowered all the way to 5°–30° C. as required when using dry sorbents, but to a higher level, e.g. to the approximate range of 40°–80° C. 80° C. The subsequent injection of the semi-dry sorbent into the flue gas duct according to the present invention results in a further reduction in the approach to saturation, due to the rapid flash drying of the sorbent. A final approach to saturation of 5°–30° C. may thereby be achieved, resulting in a significant sulfur dioxide removal in the duct and/or particulate collection devices.

An alternative embodiment of the present invention provides for performing the semi-dry sorbent injection and the additional flue gas humidification in one and the same unit, e.g., an entrained fluid bed or similar gas/solid mixing device. In this configuration, the flue gas stream is humidified to the low approach to saturation of 5°–30° C. by the combined effects of the evaporation of water, which is sprayed onto a fluidized bed of sorbent, and the evaporation of the moisture contained in the injected semi-dry sorbent.

It should be noted that in the above-described flue gas humidification/sorbent injection/gas-solid mixing processes, the sorbent is introduced as a semi-dry powder and by its rapid moisture evaporation contributes to the overall flue gas humidification, resulting in efficient sulfur dioxide removal. As should be appreciated, the invented process does not require any large and elaborately designed mixing vessel for achieving the required low approach to saturation or the efficient contact between flue gas and sorbent. This is because the semi-dry sorbent is easily introduced and dispersed as a free-flowing powder in the flue gas duct and may impact the duct wall without operational problems. The sorbent may also dry to a low residual moisture content (e.g. less than 5%) or it may dry to an intermediate level (e.g. about 15%), depending on actual operating conditions, but may in all cases remain as a free-flowing powder which can be easily collected in conventional particulate control devices.

It should be appreciated that the above-mentioned characteristics of the present invention are in the nature of improvements over existing spray dryers used for flue gas desulfurization. These typically require sophisticated flue gas dispersers as well as elaborately designed rotary or nozzle type atomizing devices to achieve intimate contact between sorbent slurry droplets and the flue gas in order to evaporate all water in the slurry at the low approach to saturation (5°–30° C.), as well as avoid the impact of any slurry droplets or wet particles on the spray dryer wall. Whereas, most commercial spray dryers are designed for a flue gas retention time of about 10 seconds, the present invention suggests that a retention time of only around 2 seconds is required for achieving significant sulfur dioxide removal when using the semi-dry sorbent. In many retrofit applications, this results in no additional reactor space or ductwork length being added, enabling retrofit with a minimum of space required.

EXAMPLES

Various experiments have been performed to exemplify the practice of the present invention and to compare the present invention to other processes. For purposes of the following examples, stoichiometric ration (SR) is herein defined based on the amount of Ca(OH)$_2$ in the sorbent as $$SR = \frac{\text{mol/h Ca(OH)}_2 \text{ injected}}{\text{mol/h SO}_2 \text{ inlet}}$$

and sorbent utilization is defined as $$\text{Utilization} = \frac{\text{SO}_2 \text{ removal}}{SR},$$

EXAMPLES I–III

Baghouse Particulate Collection

All experiments run in these three examples used a fabric filter baghouse as a particulate collector. Example II exemplifies the practice of the present invention in that it employed injection of a semi-dry calcium silicate sorbent (moisture content of about 20%) into a gas stream which had been cooled to 82° C., corresponding to an approach to saturation ($\Delta T_s$) of 44° C. In comparison, Examples I and III used injection of a dry sorbent (less than 3% moisture content) into a gas stream which had been humidified all the way to a $\Delta T_s$ of 11°–17° C.

EXAMPLE I

Dry Sorbent Prepared Using Oven Drying, No Recycle

Figure 2:
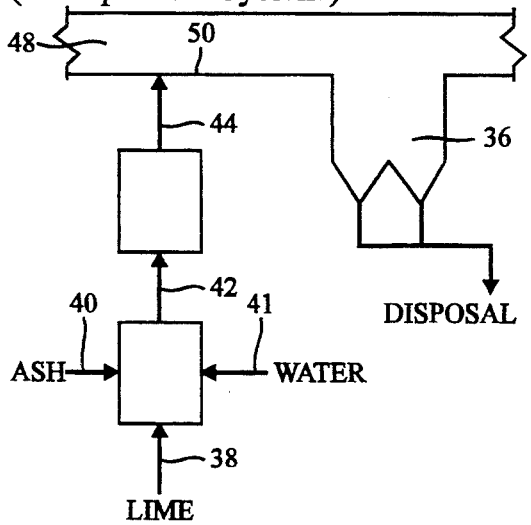
FIG. 2. Schematic diagram of the processes used in Examples I and IV.

Referring to FIG. 2, a batch 25 lb of lime 38 as Ca(OH)$_2$, 75 lb of flyash 40, and 200 lb of water 41 was mixed at 85°–95° C. for 12–16 hours. The prepared slurry 42 was filtered, producing a filter cake with a moisture content of about 60%. The filter cake was oven dried, resulting in about 100 lb of dry sorbent 44 (less than 3% residual moisture) which was easily crushed into a free-flowing powder. The sorbent 44 was injected into a 40 standard cubic ft/min (scfm) simulated flue gas stream 48 containing 1500 ppm SO$_2$ (0.6 lb/h) which had been humidified to an approach to saturation ($\Delta T_s$) of 11°–17° C. The injected sorbent was entrained with the flue gas 48 throughout a 0.8 s residence time duct 50 and collected in a fabric filter baghouse 36, which was operated at a pressure drop of 50–100 mm Water Gauge (mmWG). Various tests were run using different injection rates, and all injected sorbent was collected in the baghouse; i.e., no solids accumulation occurred in the flue gas system. Using a sorbent injection rate of 2.8 lb/h, corresponding to a stoichiometric ratio (SR) of 1.0 (based on the amount of lime in the prepared sorbent), resulted in an SO$_2$ removal of about 50%. Increasing the injection rate to 5.6 lb/h, corresponding to an SR of 2.0, resulted in an SO$_2$ removal of about 80%.

EXAMPLE II

Semi-Dry Sorbent Prepared Using Recycle Solids to Dry

Figure 3:
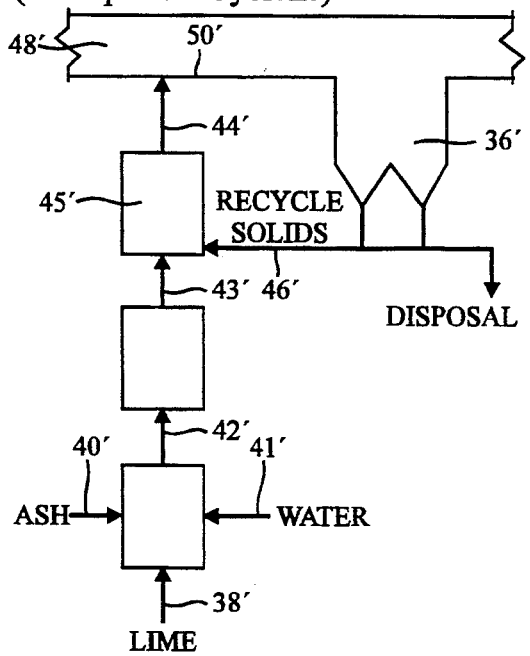
FIG. 3. Schematic diagram of the processes used in Examples II, III and V.

Referring to FIG. 3, a batch of 25 lb of lime 38' as $Ca(OH)_2$, 75 lb of flyash 40' and 200 lb of water 41' was mixed at 85°–95° C. for 12–16 hours. The prepared slurry 42' was filtered, producing a filter cake 43' with about 60% moisture. A batch of 50 lb of the filter cake 43' was mixed in a mortar mixer 45' with 100 lb of dry solids collected in Example I, to produce the sorbent 44'. The sorbent 44' contained about 20% residual moisture, but appeared dry and was fairly easily handled as a normal dry solid. The prepared batch of semi-dry sorbent 44' was injected into a 40 scfm simulated flue gas stream 48' containing 1500 ppm $SO_2$ (0.6 lb/h), which had been cooled to a temperature of 82° C., corresponding to a $\Delta Ts$ of 44° C. The injection rate of sorbent 44' was 8.3 lb/h, corresponding to an SR of 0.4. The flue gas temperature decreased throughout the 0.8 s residence time duct 50' to 49°–55° C. in the baghouse 36', corresponding to a $\Delta Ts$ of 11°–17° C. An $SO_2$ removal efficiency of about 50% was measured. The sorbent, injected with a moisture content of 20%, flash dried to a residual moisture of about 5%, and was collected in the baghouse 36', which was operated at a pressure drop of 50–100 mmWG. All injected sorbent was collected and no accumulation or solids scaling in the flue gas system was observed.

The 120 lb of spent solids 46' collected from the first run was recycled to the mortar mixer 45' and mixed with 60 lb of the filter cake 43' prepared above, and the prepared semi-dry sorbent 44' was again injected into the flue gas stream 48', in a similar procedure to that described above. Several tests were run using a sorbent injection rate in the range of 8.3–12.5 lb/h, corresponding to an SR of 0.4–0.6. Again, about 50% $SO_2$ removal was measured.

A third semi-dry sorbent preparation procedure was done by mixing the 144 lb of spent solids 46' collected in the second injection series with 72 lb of the filter cake 43' from above in the mortar mixer 45'. Injection of the prepared semi-dry sorbent 44' at similar conditions as described above, and using an injection rate of 10.4 to 12.4 lb/h (SR in the range 0.5–0.6) again resulted in about 50% $SO_2$ removal.

EXAMPLE III

Dry Sorbent Prepared Using Recycle Solids and Oven Drying

A comprehensive test series was undertaken in order to investigate the $SO_2$ removal which is achieved for a given stoichiometric ratio. Referring to FIG. 3, the procedure used for slurrying and mixing was identical to that used in Example II, except that the semi-dry sorbent 44' was prepared by mixing one part of filter cake 43' with one part of recycle solids 46' from the preceding test and then oven dried prior to injection. This test series used injection of the sorbent 44' into the simulated flue gas stream 48' humidified to a $\Delta Ts$ of 11°–17° C. Therefore, Example III studied the dry reaction between sorbent and gaseous $SO_2$. Seven consecutive recycle tests were performed and the results are presented in Table 1. The overall SR was about 0.6. It appears that the sorbent utilization decreased from an apparent value of 115% in the first recycle test (presumably due to residual alcalinity in the equipment from previous testing) and leveled off around 80% utilization later in the test series. The approach to saturation was 10° C. and a slight increase in temperature was observed across the baghouse 36', presumably as a result of the $SO_2$/sorbent reaction on the filter bags. $SO_2$ removal occurring in the duct section 50' prior to the baghouse 36' ranged from 18–32%.

TABLE 1

DRY INJECTION OF FLYASH-ENHANCED LIME SORBENT
Fresh Sorbent Cake Residual Moisture = 50–60%
Recycle Solids/Sorbent Cake = 1:1
Sorbent Mixture Oven Dried Prior to Injection
Duct Injection/Baghouse Pilot Plant Facility

| | Recycle test no. | | | | | | |
|---|---|---|---|---|---|---|---|
| | 1 | 2 | 3 | 4 | 5 | 6 | 7 |
| Duration, h | 7 | 7 | 6.5 | 7.5 | 6 | 7 | 7 |
| $SO_2$ inlet concentration, ppm | 1530 | 1550 | 1500 | 1480 | 1470 | 1450 | 1530 |
| Temperatures: | | | | | | | |
| Humidifier inlet, °C. (°F.) | 177 (350) | 177 (350) | 176 (349) | 178 (352) | 180 (356) | 178 (352) | 179 (355) |
| Humidifier outlet, °C. (°F.) | 49 (120) | 49 (120) | 49 (120) | 49 (120) | 50 (122) | 50 (122) | 50 (122) |
| Wet bulb, °C. (°F.) | 41 (106) | 41 (105) | 41 (105) | 41 (105) | 42 (107) | 41 (106) | 41 (105) |
| Baghouse inlet, °C. (°F.) | 49 (121) | 49 (121) | 51 (123) | 49 (121) | 51 (123) | 51 (123) | 49 (121) |
| Baghouse outlet, °C. (°F.) | 52 (125) | 52 (126) | 52 (126) | 52 (125) | 52 (125) | 52 (125) | 51 (124) |
| $\Delta P$ baghouse, mm (in.) WG | 78 (3.1) | 80 (3.2) | 78 (3.1) | 88 (3.5) | 78 (3.1) | 78 (3.1) | 68 (2.7) |
| SR | 0.59 | 0.62 | 0.53 | 0.61 | 0.62 | 0.62 | 0.53 |
| $SO_2$ removal in duct, % | 32 | 28 | 25 | 22 | 25 | 18 | 23 |
| $SO_2$ removal in baghouse, % | 36 | 33 | 28 | 31 | 25 | 31 | 22 |
| $So_2$ removal total, % | 68 | 61 | 53 | 53 | 50 | 49 | 45 |
| Utilization, % | 115 | 98 | 100 | 87 | 81 | 79 | 85 |

EXAMPLES IV–VII

Cyclone Particulate Collection

All experiments run in these four experiments used a cyclone as a particulate collector. A cyclone was employed as representative of all non-fabric particulate collectors. Examples V–VII exemplify the practice of the present invention in that they all used injection of semi-dry calcium silicate sorbents having moisture contents on the order of 20–25% into gas streams having $\Delta Ts$ on the order of 33°–55° C. In comparison, Example IV used injection of dry sorbents (less than 3% moisture content) into a pre-humidified gas stream ($\Delta Ts$ of 11°–17° C.).

EXAMPLE IV

Dry Sorbent Prepared Using Oven/Spray Drying, No Recycle

Figure 6:
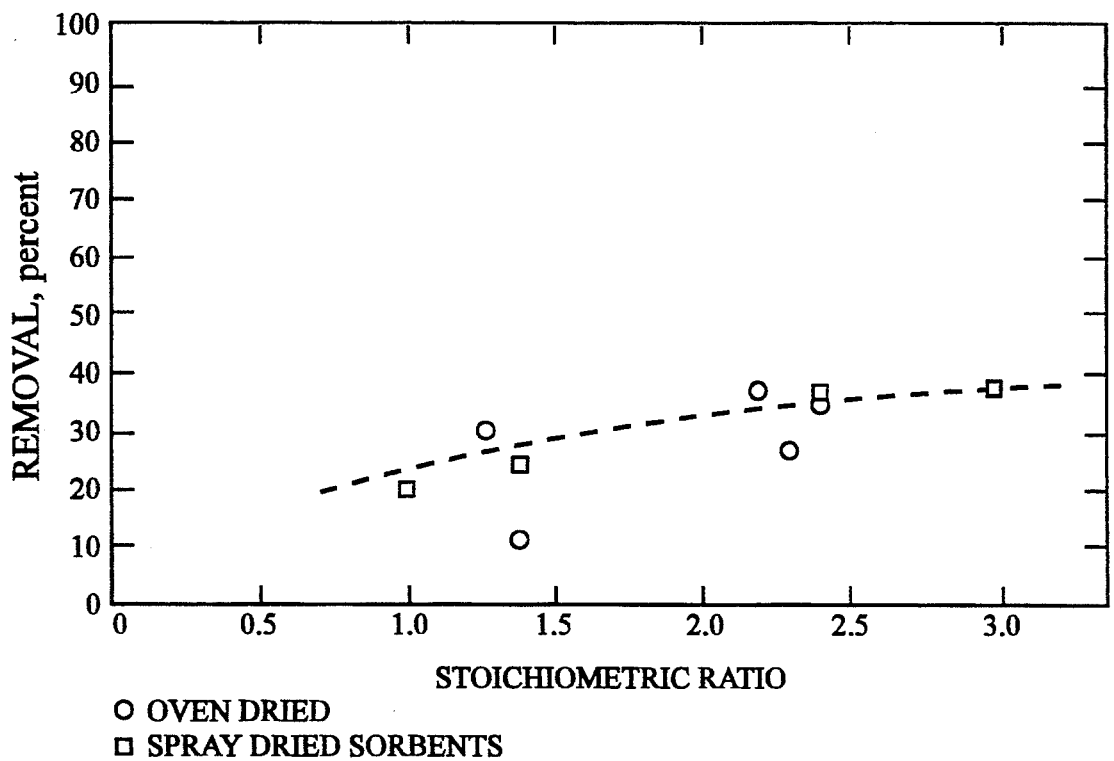
FIG. 6. Plot of removal of SO$_2$ vs. the stoichiometric ratio of Ca(OH)$_2$ injected to SO$_2$ inlet, in a duct injection/cyclone pilot plant facility, using oven dried and spray dried sorbents. Data were taken from Example IV.

Referring to FIG. 2, a batch of 25 lb of lime 38 as $Ca(OH)_2$, 75 lb of flyash 40, and 200 lb of water 41 was mixed at 85°–95° C. for 12–16 hours. The prepared slurry 42 was filtered, producing a filter cake with a moisture content of about 60%. The filter cake was oven dried to produce about 100 lb of dry sorbent 44 (less than 3% residual moisture) which was easily crushed into a free-flowing powder. Another slurry 42 was prepared using a similar procedure, and spray dried on a 2000 actual cubit ft/min (acfm) facility, using a spray dryer outlet temperature of about 115° C., in order to produce a dry and free-flowing powder sorbent 44. The prepared sorbents 44 were respectively injected into a 40 scfm simulated flue gas stream 48 containing 1500 ppm $SO_2$ (0.6 lb/h) which had been humidified to a $\Delta Ts$ of 8°–13° C., and the injected sorbents 48 were entrained with the flue gas 48 throughout a 2.0 s residence time duct 50 and collected in a cyclone separator 36. Various test runs were made using sorbent injection rates in the range of 2.8 to 8.4 lb/h, corresponding to an SR in the range of 1 to 3. The $SO_2$ removal, as shown in FIG. 6, was 20–35%.

In comparison, a test run was made injecting the sorbent 44 at an SR of 1.4 into a gas stream 48 humidified to a $\Delta Ts$ of 16° C., yielding an $SO_2$ removal of only 9%. A run injecting the sorbent 44 at an SR of 2.2 into a gas stream 48 humidified to a $\Delta Ts$ of 5° C. yielded an $SO_2$ removal of 50%.

EXAMPLE V

Semi-Dry Sorbent Prepared Using Flyash as Silica Source

Referring to a FIG. 3, a batch of 25 lb of lime 38' as $Ca(OH)_2$, 75 lb of flyash 40', and 200 lb of water 41' was mixed at 85°–95° C. for 12–16 hours. The prepared slurry 42' was filtered, producing a filter cake 43' with a moisture content of about 60%. A batch of 50 lb of the filter cake 43' was mixed in a mortar type of mixer 45' with 100 lb of dry solids collected from the cyclone separator from Example IV. The resulting sorbent 44', containing about 20% moisture, appeared dry and could be handled relatively easily in conventional powder handling equipment.

The batch of semi-dry sorbent 44' was injected into a 40 scfm simulated flue gas stream 48' containing 1500 ppm $SO_2$ (0.6 lb/h) which had been cooled to 82°–93° C. ($\Delta Ts$ of 44°–55° C.). Several tests were done using sorbent injection rates in the range of 4.2–20.8 lb/h, corresponding to an SR of 0.2–1.0. The moisture evaporation lowered the flue gas temperature throughout the 2.0 s gas retention time duct section 50' to 43°–55° C. at the cyclone 36', corresponding to a $\Delta Ts$ of 5°–17° C. An $SO_2$ removal efficiency across the duct/cyclone section in the range of 10–70% was observed. Dry and free-flowing spent solids (about 5% residual moisture) were collected in the cyclone 36', which operated with a capture efficiency of 80–90%. All injected solids were recovered and no product build-up or duct scaling was observed.

The 120 lb of spent solids 46' collected was recycled and mixed with 60 lb of the above-prepared filter cake 43' in the mortar mixer 45', and the produced semidry sorbent containing about 20% moisture was re-injected in the simulated flue gas 48' in a method similar to that described above. Several tests were performed using sorbent injection rates in the range of 8.3–20.8 lb/h, corresponding to an SR in the range 0.4–1.0, and 25 to 45% $SO_2$ removal was achieved.

A third semi-dry sorbent preparation procedure was done using the 144 lb of dry product 46' produced above and mixing with another 72 lb of filter cake 43'. Injection of the semi-dry sorbent 44' (20% residual moisture) at a rate of 20.8 lb/h, corresponding to an SR of 1, resulted in an $SO_2$ removal of 44%. Again, all injected sorbent was recovered as a dry and free-flowing powder and collected in the cyclone 36'.

Figure 7:
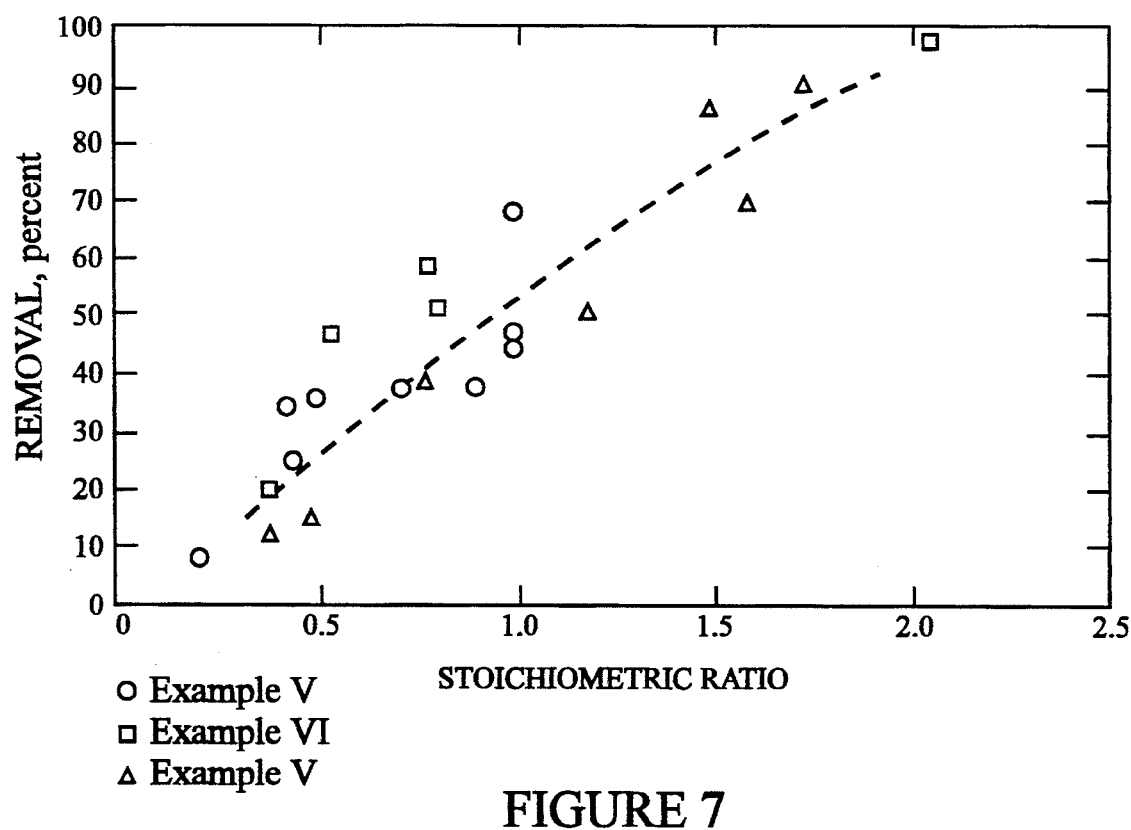
FIG. 7. Plot of removal of SO$_2$ vs. the stoichiometric metric ration of Ca(OH)$_2$ injected to SO$_2$ inlet, using sorbents dried by mixing spent solids. Data were taken from Examples V, VI, and VII.

The above-reported $SO_2$ removal data have been depicted versus SR and included in FIG. 7. It appears that an average utilization of about 50% was achieved.

EXAMPLE VI

Semi-Dry Sorbent Prepared By Filtering Slurry Before Mixing With Recycle Solids

Figure 4:
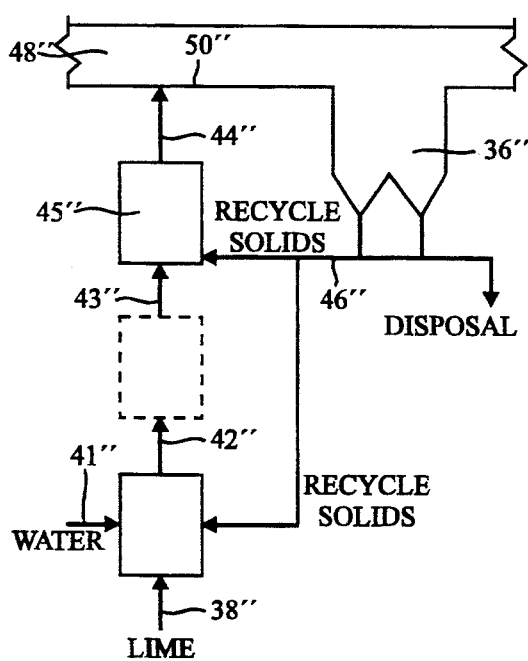
FIG. 4. Schematic diagram of the processes used in Examples VI and VII.

Referring to FIG. 4, a batch of 16 lb of lime 38" as $Ca(OH)_2$, 72 lb of spent solids from Example V, and 200 lb of water 41" was mixed at 85°–95° C. for 12–16 hours. The slurry 42" was filtered, producing a filter cake 43" with about 60% moisture. A 50 lb batch of the filter cake 43" was mixed in a mortar mixer 45" with additional 100 lb of spent solids (also from Example V) to produce a semi-dry sorbent 44" with about 20% moisture. This product appeared as a relatively free-flowing dry solid, similar to the previously described product produced from slurrying lime and flyash only.

The prepared batch of semi-dry sorbent 44" was injected into a simulated flue gas stream 48" containing 1500 ppm $SO_2$ (0.60 lb/h) which had been cooled to 71°–93° C. ($\Delta Ts$ of 33°–55° C.). Two tests were run at different sorbent injection rates, namely 49.2 lb/h (corresponding to an SR of 2.1) and 8.2 lb/h (corresponding to an SR of 0.35). The flue gas 48" was cooled to an approach to saturation of about 10° C. due to moisture evaporation, and an $SO_2$ removal of 98% (for SR of 2.1) and 21% (for SR of 0.35), respectively, was measured. All injected solids were recovered as dry and free-flowing spent solids, collected in a cyclone 36" having 80–90% capture efficiency.

The 120 lb of solids 46" collected was mixed in the mortar mixer 45" with another 60 lb of the prepared filter cake 43". The resulting semi-dry sorbent 44" with about 20% moisture was injected in the simulated flue gas stream 48" at conditions similar to those described above. Two test runs were made using sorbent injection rates of 12.9 and 18.7 lb/h, corresponding to SRs of 0.55 and 0.8. Removal efficiencies for $SO_2$ of 47% and 59% were measured, respectively.

A third semi-dry sorbent preparation procedure was undertaken using the 144 lb of dry solids 46" collected in the previous runs and mixing with 72 lb of the filter cake 43". Injection of the prepared sorbent 44" into the simulated flue gas stream 48" at similar conditions, using an injection rate of 18.7 lb/h (corresponding to an SR of 0.8) resulted in an $SO_2$ removal of 51%. Based on the amount of $Ca(OH)_2$ used for sorbent preparation, this removal efficiency corresponded to a utilization of about 64%.

All of the above-reported $SO_2$ removal data have been depicted versus SR and included in FIG. 7.

EXAMPLE VII

Semi-Dry Sorbent Prepared By Mixing Recycle Solids Directly With Slurry

Referring to FIG. 4, a batch of lime 38" as 7.8 lb of Ca(OH)$_2$, 2.5 lb of flyash, 32.5 lb of spent solids from Example VI, and 75 lb of water 41" was mixed at 85°–95° C. for 12–16 hours. An additional 100 lb of spent solids (also from Example VI) and 7.5 lb of flyash was mixed with 50 lb of the produced slurry 42" in a mortar mixer 45", producing a semi-dry sorbent 44" with 20% moisture. The sorbent 44" appeared dry and could be handled by conventional solids handling equipment, similar to the products previously described by mixing filter cake with recycle solids.

The prepared semi-dry sorbent 44" was injected into a 40 scfm simulated flue gas stream 48" containing 1500 ppm SO$_2$ (0.6 lb/h) which had been cooled to 71°–93° C. ($\Delta$Ts of 33°–55° C.), and the sorbent was entrained throughout a 2.0 s gas retention time duct section 50" to a cyclone 36" for collection. Evaporative cooling due to moisture evaporation lowered the gas temperature to a $\Delta$Ts of 5°–17° C., and dry, free-flowing spent solids were collected in the cyclone 36". Several tests were run using an injection rate of sorbent in the range of 12.0–58.2 lb/h, corresponding to an SR in the range of 0.35–1.7. Removal efficiencies of 14 to 89% across the duct/cyclone system were measured.

A second batch of 7.5 lb of lime 38" as Ca(OH)$_2$, 2.5 lb of flyash, and 32.5 lb of the solids 46" collected above was mixed with 75 lb of water 41" at 85°–95° C. for 12–16 hours. A batch of 50 lb of the prepared slurry 42" was mixed with an additional 100 lb of recycle solids 46" and 7.5 lb of flyash in the mortar mixer 45" to produce a semi-dry sorbent 44' with about 20% moisture content. The sorbent 44" was injected into the simulated flue gas stream 48" at a rate in the range of 17.1–51.4 lb/h, corresponding to an SR in the range of 0.5–1.5, resulting in a measured SO$_2$ removal efficiency of 17 to 82%. Evaporative gas cooling and collection of a dry product from the cyclone was observed.

A third batch of 7.5 lb of lime 38" as Ca(OH)$_2$, 2.5 lb of flyash and 32.5 lb of the above-produced recycle solids 46" was slurried at 85°–95° C. and 12–16 hours. An additional 100 lb of recycle solids 46" from above and 7.5 lb of flyash was mixed with 50 lb of the prepared slurry 42" in a mortar mixer 45", resulting in a semi-dry sorbent 44" with 20% moisture. Two injection tests were performed at the flue gas conditions specified above. Using a sorbent injection rate of 54.8 lb/h (corresponding to an SR of 1.6) resulted in 68% SO$_2$ removal. Lowering the injection rate to 27.4 lb/h (corresponding to an SR of 0.8) resulted in 37% SO$_2$ removal. These two tests reflected an overall Ca(OH)$_2$ utilization in the duct/cyclone dry injection system of around 45%.

The above-reported SO$_2$ removal data are depicted versus SR and included in FIG. 7.

EXAMPLE VIII

Pressure Hydration Sorbent Preparation

Example VIII exemplifies the practice of the present invention in that it used injection of semi-dry calcium silicate sorbents prepared by pressure hydration. Note in comparison that the sorbents used in Examples I–VII all were prepared by slurring/drying means. The procedure of producing the semi-dry sorbent by hydration of lime plus a silica source at a high temperature and pressure (about 150° C. and 5–6 atm) for a short time period (1–2 hours) functioned to replace the previously performed slurrying process at atmospheric conditions (i.e. at a temperature of 85°–95° C. and pressure of 1 atm) for prolonged time periods (12–16 hours).

The first test run mixed 75 lb of lime 38''' as CaO, in an agitated autoclave reactor 52''' with 25 lb of water 41''', which was added over a time period of 40 min at 130°–190° C. (Note that no silica source was added). Mixing was continued for another 30 min at 150° C. After cooling and depressurization of the reactor 52''', a batch of 83 lb of dry (less than 3% residual moisture) and free-flowing powder sorbent 44''' was discharged. Bench-scale testing using exposure of 1 g of the sorbent 44''' in a packed bed reactor 50''' to a simulated flue gas stream 48'''' (4.7 l/min) containing 500 ppm SO$_2$ at 64° C. and with a relative humidity of 60% (corresponding to a $\Delta$Ts of 10° C.) revealed a conversion of only 0.11 mol SO$_2$/mol Ca(OH)$_2$. Commercially available reagent grade Ca(OH)$_2$s often have conversions in the range 0.16–0.18 mol SO$_2$/mol Ca(OH)$_2$, as measured in the same apparatus.

The second test run mixed 19 lb of lime 38''' as CaO plus 75 lb of flyash 40''' with 41 lb of water 41''' over a time period of 45 min at 115°–155° C., followed by continued mixing at 150° C. for one hour. An amount of 45 lb sorbent 44''' was discharged as a free-flowing powder after cooling and depressurization. The sorbent 44''' had a moisture content of about 20% and appeared similar to the previously described semi-dry sorbent. Bench-scale testing revealed that the sorbent 44''' was significantly enhanced with respect to SO$_2$ reactivity, relative to the hydrated lime sorbent produced in the first test run. A conversion of 0.53 mol SO$_2$/mol Ca(OH)$_2$ was measured in the packed bed reactor 50'''.

The third test run mixed 19 lb of lime 38''' as CaO plus 75 lb flyash 40''' with 60 lb of water 41''' at 71°–98° C. over a time period of 25 min, followed by continued agitation at 140°–150° C. for 75 min. The reactor 52''' was cooled and depressurized and 49 lb of free-flowing sorbent 44''' was discharged as a semi-dry material with around 25% residual moisture. Bench-scale testing at the above-mentioned conditions revealed a conversion of 0.47 mol SO$_2$/mol Ca(OH)$_2$.

The fourth test mixed 25 lb of lime 38''' as CaO plus 67 lb flyash 40''' with 75 lb of water 41''' over a time period of 11 min at 73°–160° C., followed by continued agitation for 1 hour at 150°–160° C. The reactor 52''' was depressurized and cooled, and 128 lb of sorbent 44' was discharged as a free-flowing powder, having around 30% residual moisture. Benchscale testing at the previously specified conditions revealed a significant reactivity towards SO$_2$, i.e., a conversion of 0.54 mol SO$_2$/mol Ca(OH)$_2$.

CONCLUSIONS FROM EXAMPLES

Example I, which used a once-through injection of dry sorbent into a substantially pre-humidified gas stream, revealed an SO$_2$ removal of 50% for an SR of (corresponding to a sorbent utilization of 50%) and about 80% removal of an SR of 2 corresponding to a sorbent utilization of 40%).

Example II used a recycle of spent solids to dry the calcium silicate mixture to a desired moisture content, thereby producing a semi-dry sorbent. The results indicate that a sorbent utilization of at least 80% at an SR of about 0.4 to 0.6 is achievable by the residence time provided by using the combination of recycle of sorbent and a baghouse for particulate collection.

It should be noted that direct injection of the filter cakes (60% moisture content) produced in Example II (after filtering slurries) into the gas stream would not have been feasible using conventional dry injection equipment. However, by lowering the moisture content to about 20% by adding two parts of spent solids for one part of filter cake, a handleable, semi-dry powder was produced which could easily be injected. Thus, the semi-dry sorbent did not require any separate drying process, and all of the moisture in the filter cake could be introduced with the semi-dry sorbent. This moisture evaporated into the gas during the residence time provided by the duct and baghouse, thereby lowering the approach to saturation of the gas and achieving efficient $SO_2$ removal.

The evaporation of moisture from the injected sorbent in Example II caused a lowering of the approach to saturation of the flue gas to 11°–17° C., resulting in a significant $SO_2$ removal. It is believed that the reaction between $SO_2$ and sorbent occurred both during the sorbent drying process in the duct as well as during the 10 to 30 minutes that the dried sorbent was deposited on the fabric filter bags in the baghouse.

Example III was similar to Example II, except that the sorbent was oven dried prior to injection into the flue gas, and the flue gas was pre-humidified to a much greater extent in Example III. Thus, in Example II, $\Delta Ts$ of the gas before injection was 44° C., while in Example III it was 11°–17° C. Comparing Example III to Example II, the results indicate that about the same sorbent utilization is achieved (i.e. about 80%) at similar SRs (about 0.6). This illustrates the reduced pre-humidification requirements when using semi-dry sorbents provided by the present invention.

Example IV, when compared to Example I, illustrates the superior performance of an absorption system using a baghouse for particulate collection as opposed to a cyclone. The results of Example IV revealed that $SO_2$ removal using a cyclone separator was only 50–33% of the removal achieved when injecting a similar sorbent into a system equipped with a baghouse (Example I), presumably due to the longer sorbent residence time on the fabric filter bags. Furthermore, the 15–25% sorbent utilization exhibited in Example IV was significantly lower than that achieved in Example I (40–50%).

In Example IV, no significant difference in terms of $SO_2$ removal was observed between the performance of the sorbent prepared by oven drying and that prepared by spray drying, despite the coarser particle size of the spray dried product. The single most important parameter affecting the $SO_2$ removal across the duct section appeared to be the approach to saturation, as illustrated by the 50% removal achieved at a $\Delta Ts$ of 5° C. versus only 9% obtained at a $\Delta Ts$ of 16° C.

Example V used mixing of two parts of recycle spent solids into a filter cake of silica-enhanced lime. The experiment demonstrated that in addition to the avoidance of a separate sorbent drying step, the direct injection of the semi-dry sorbent into the flue gas stream resulted in significant $SO_2$ removal occurring simultaneously with the flash drying throughout the duct. The results indicated that a sorbent utilization of about 50% was achieved. The ability of the prepared sorbent to contain 20–30% moisture and still appear as a fairly dry powder, and to flash dry at a low approach to saturation (5°–17° C.) when entrained in the gas stream for about two seconds, were both characteristics which were utilized for achieving a significant $SO_2$ removal efficiency.

Thus, Example V exemplifies a preferred embodiment of the present invention in that it injected semi-dry sorbent into a short residence time duct section. However, another embodiment of the invention incorporates a longer residence time of the sorbent in the gas stream, e.g., by using an entrained fluid bed or similar gas/solid tubular reactor upstream of an electrostatic precipitator, if higher sorbent utilizations are desired.

Examples I–V all used pure flyash as a silica source for enhancing the lime during slurrying. Pure flyash might not be available in many applications of this process, however. For example, there may be no separate particulate collector located upstream of the flue gas desulfurization ("FGD") system, or no separate boiler unit. If these sources are not available, then the preferred embodiment of the present invention uses recycled solids from the particulate collector of the FGD system as the source of silica, rather than pure flyash. Examples VI and VII, simulate such continuous processes. (A small amount of flyash was used in Example VII). The weight ratio between recycle solids and make-up lime was maintained at about 4.5 to 1 due to the content of unused lime and reaction products (mainly calcium sulfite). This should be compared to the preferred ratio of 3 to 1 between the silica rich flyash and the lime.

The major difference between Examples VI and VII was that Example VI used the concept of filtering the prepared slurry of silica-enhanced lime prior to the mixing with additional recycle solids for preparation of the semi-dry sorbent. Example VII represented the preferred embodiment of the invention, however, inasmuch as it eliminated the filtration step by mixing the additional recycle solids directly into the slurry of silica-enhanced lime. Example VII therefore used the flue gas for the evaporation of all water introduced in the process for preparing the sorbent, which also optimized the potential lowering of the approach to saturation of the flue gas leading to increased $SO_2$ removal.

Examples VI and VII indicated an overall lime utilization of about 50%. As these tests were performed at conditions similar to those reported for Example V, it can be concluded that the addition of recycled spent solids (calcium sulfite/sulfate) to the slurrying tank does not negatively impact the occurring silica-enhancement process, as indicated by the reactivity of the produced sorbent with respect to $SO_2$ removal. Furthermore, the presence of spent solids with the silica during the slurrying process did not adversely impact the sorbent's ability to retain 20–30% moisture and appear as a dry powder, or change its flash drying characteristics at a low approach to saturation temperature.

Examples I–VII all used slurrying of lime with the silica source at 85°–95° C. for prolonged time periods (12–16 hours) as the initial step for producing the enhanced sorbent. Example VIII reported on a separate test series which was performed in a 4.5 cu.ft. pilot autoclave unit, and in which the sorbent was prepared by mixing quicklime and flyash with water at about 150° C. for a significantly shorter time period (1 hour). The high temperature was achieved by pressurizing the vessel to about 5–6 atm, and mixing was accomplished by plows rotating along the sides of the cylindrical, horizontal vessel, thereby producing a mechanical fluidization of the product.

Three different batches of varying compositions (different flyash/lime ratios and water contents) were prepared, all producing semi-dry solids with a moisture content in the range 20-30% (test runs 2 through 4). These semi-dry sorbents showed significantly higher conversions with $SO_2$ in the bench-scale test apparatus (0.47-0.53 mol $SO_2$/mol $Ca(OH)_2$) than that of pure $Ca(OH)_2$ which had been pressure hydrated on the same unit (0.11 mol $SO_2$/mol $Ca(OH)_2$). The flyash-enhanced sorbent produced by pressure hydration of quicklime for 1 hour on pilot scale therefore revealed reactivities with respect to dry $SO_2$ removal of the same order of magnitude as that of flyash-enhanced lime produced by atmospheric slurrying at 85°-95° C. for 12-16 hours.

It should be noted that the pressure hydrated, flyash-enhanced sorbent contained 20-30% moisture and still appeared as a relatively free-flowing powder. As illustrated by Example VIII, it is believed that optimum operation of a pressure hydrator in accordance with the present invention is achieved by appropriate adjustment of the ratio between the silica source and the lime, as well as of the amount of water added and the water addition rate, as indicated by the improvements in product yield in the runs 2 through 4. It is also believed that the product composition in the pressure hydrator should be maintained as either a liquid slurry or a semi-dry powder, as any paste characteristics in the slurry would cause excessive power consumption.

Example VIII exemplified, the preferred embodiment of the present invention when using pressure hydration for sorbent preparation. In the preferred embodiment, quicklime is hydrated with recycle solids (containing silica) under pressurized conditions, whereby the heat of hydration according to the invention will provide part or all of the enthalpy required to raise the temperature to the preferred range of 140°-160° C. Mixing of the product for about 1 hour or less at this temperature results in significant enhancement of the lime with respect to its use as a sorbent for dry $SO_2$ removal. A sorbent with a preferred 20-30% residual moisture can according to the present invention be discharged as a free-flowing powder, suitable for injection into the flue gas duct. The sorbent will flash dry in the duct when provided with about 2 seconds residence time and can be collected as a dry product by an ESP. The flash drying may result in lowering of the flue gas temperature to a preferred approach to saturation of 5°-30° C., thereby significantly increasing the $SO_2$ removal throughout the duct section. Part of the dry spent solids collected can be recycled for sorbent preparation in the pressure hydrator.

Figure 5:
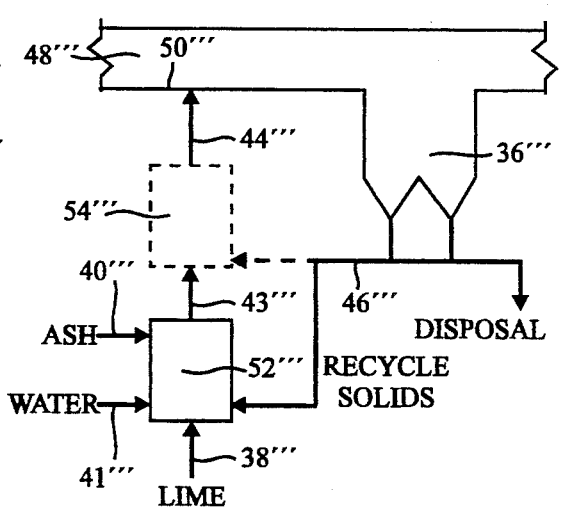
FIG. 5. Schematic diagram of the process used in Example VIII.

The above-described preferred embodiment of the invention discharges the semi-dry sorbent directly from the pressure hydrator (after excess steam had been released). An alternative embodiment of the invention, as illustrated in FIG. 5, provides for discharging the prepared sorbent as a slurry 43''', and then adding a significant amount of additional recycled spent solids 46''' in a separate mixer 54''' (possibly a ribbon blender type) located downstream of the pressure hydrator 52''' in order to produce the semi-dry sorbent 44'''. Some advantages of this embodiment of the invention are that the size of the pressure hydrator 52''' is reduced (due to less solids throughput), and the need to use an auxiliary steam for heating to the desired temperature is reduced or eliminated.

Another embodiment of the present invention maintains the discharge from the pressure hydrator as a semi-dry product. However, a minor amount of additional spent solids is added in a separate mixer downstream which, by cooling and moisture dissipation, further dries the sorbent. This embodiment provides the advantage of improving the sorbent's characteristics with respect to storage and handling. Any or a combination of the above-indicated process routes would be considered an embodiment of the present invention relating to the preparation of a semi-dry, silica-enhanced lime sorbent.

ALTERNATIVE EMBODIMENTS

Figure 8:
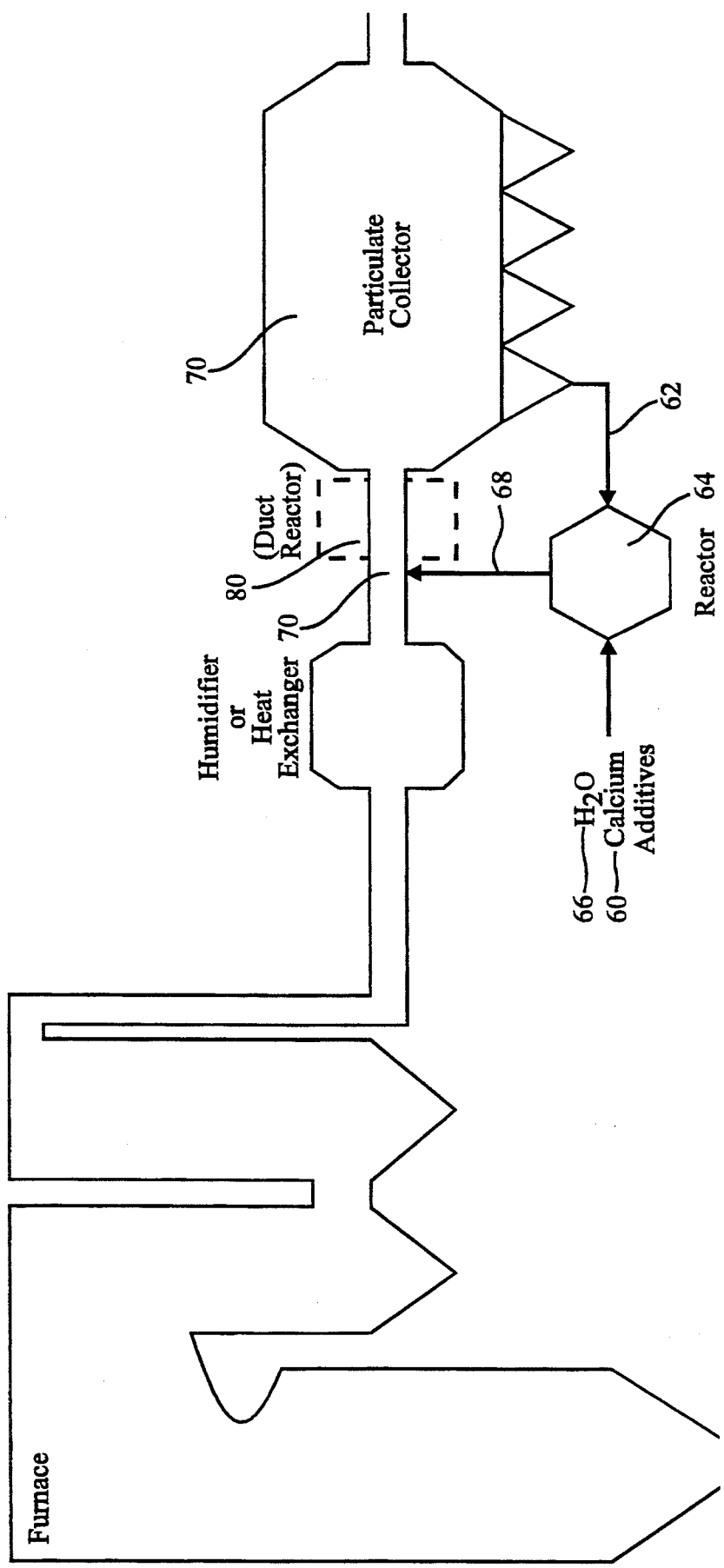
FIG. 8. Schematic diagram of processes using a furnace with duct injection of calcium silicates.

1. Conventional Boiler or Furnace with Duct Sorbent Injection (FIG. 8).

The basic embodiment of this process uses a suitable calcium source 60 such as lime in conjunction with calcium and silica naturally occurring in flyash 62. The flyash 62 is mixed in a reactor vessel 64 with an appropriate amount of lime 60 and water 66 under conditions which promote the formation of calcium silicates 68. The calcium silicates 68 are injected into the flue gas duct work 70 where simultaneous gas cooling and reaction of calcium silicates with acid gas components occur. The spent solids are collected in the particulate collection device 70.

Figure 9:
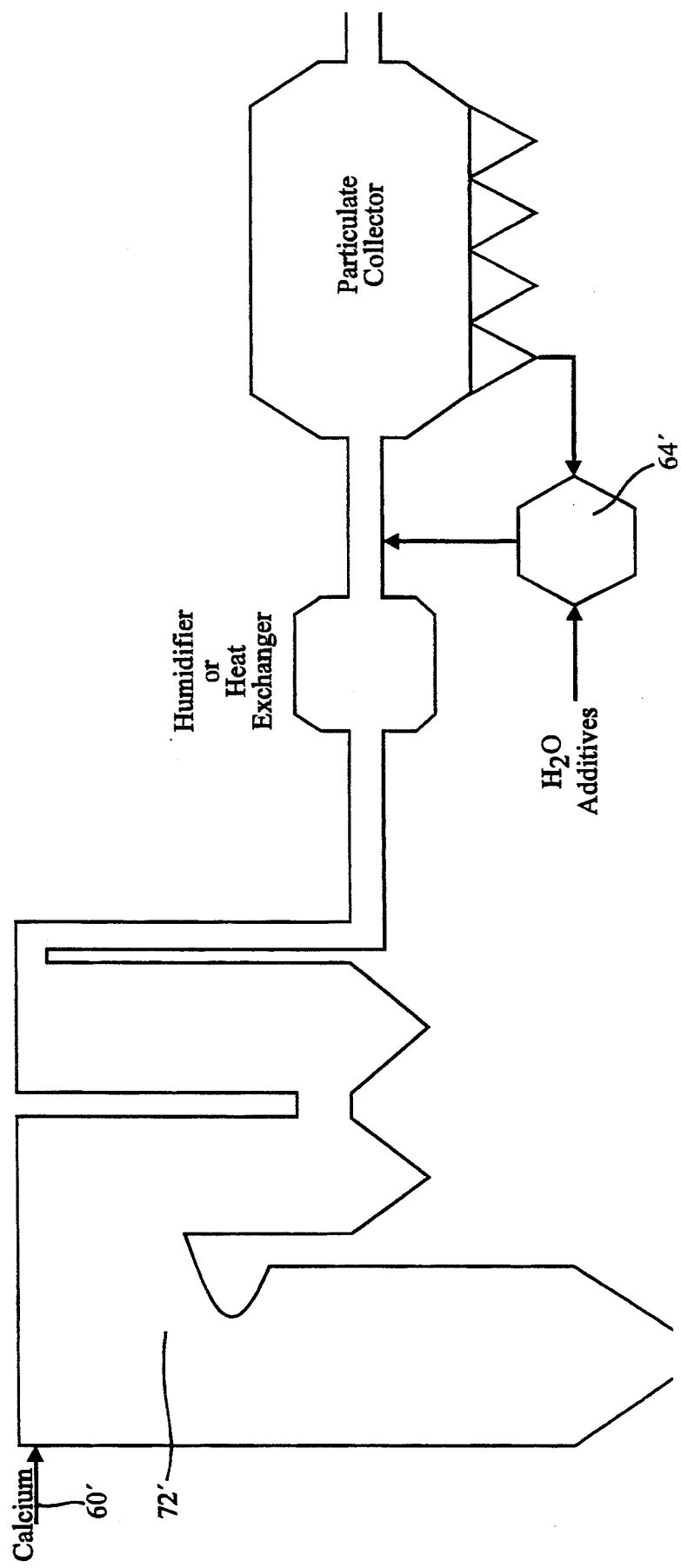
FIG. 9. Schematic diagram of a process using calcium injection into a furnace followed by duct rejection of calcium silicates.

2. Conventional Boiler or Furnace with Furnace Calcium Injection (FIG. 9).

The process steps are essentially the same as process 1, except that the calcium source 60' is injected in the furnace 72' and the additional calcium introduced into the mixing/reactor vessel 64' is considerably reduced or none, depending on the amount introduced into the furnace 72'.

Figure 10:
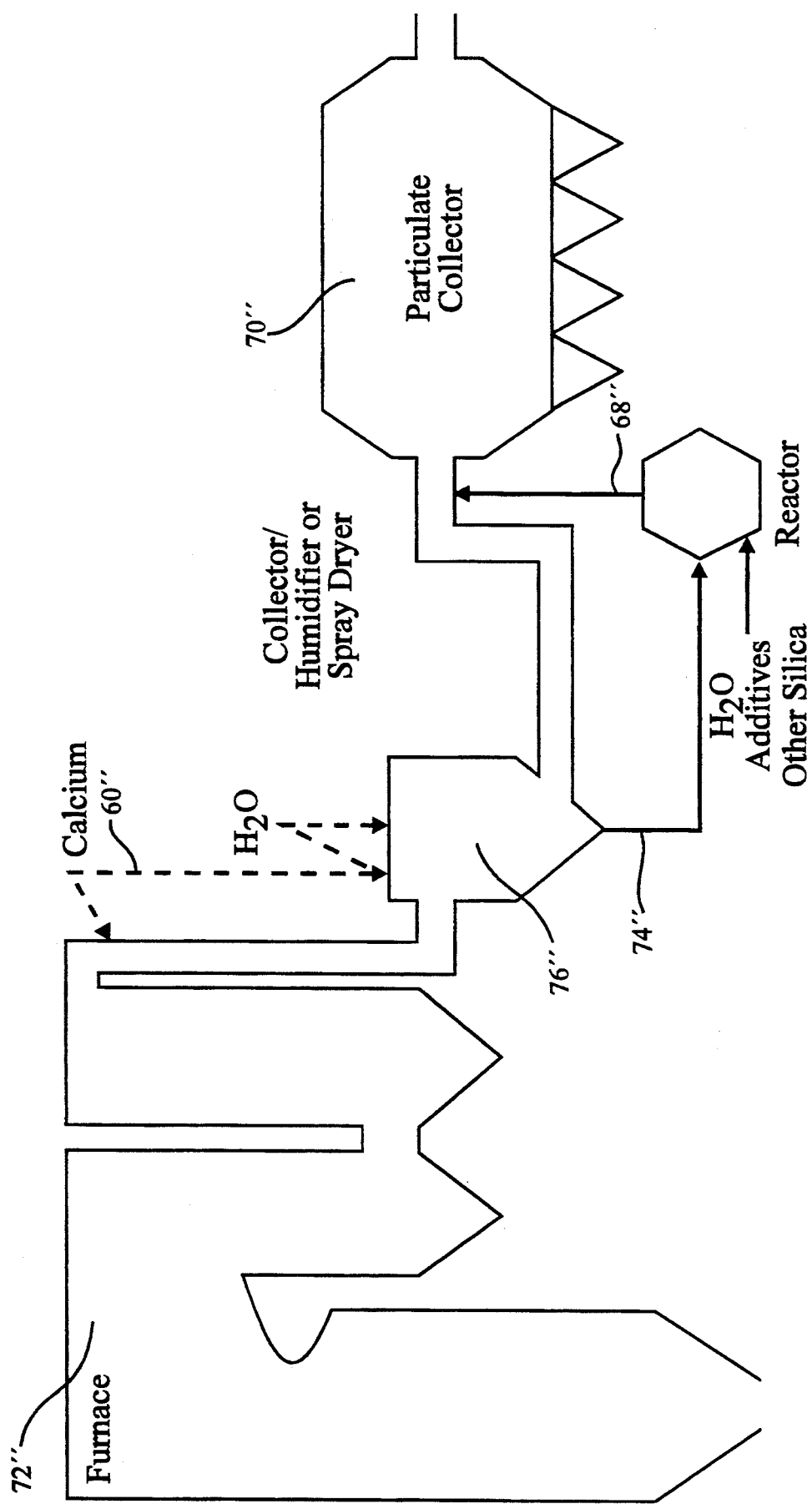
FIG. 10. Schematic diagram of a process using calcium injection upstream of calcium silicate injection.

3. Conventional Boiler or Furnace with Calcium Injection Upstream (FIG. 10).

The process steps are essentially the same as process 1, except that the calcium source 60'' is injected downstream of the furnace 72'' and provides the calcium to the process through the recycle stream 74''. An example would be a spray dryer 76'' followed by a particulate collector 70'' with the calcium silicate sorbent 68'' added downstream of the spray dryer 76''. This is best suited for retrofit of existing once-through spray dryers on municipal incinerators.

Figure 11:
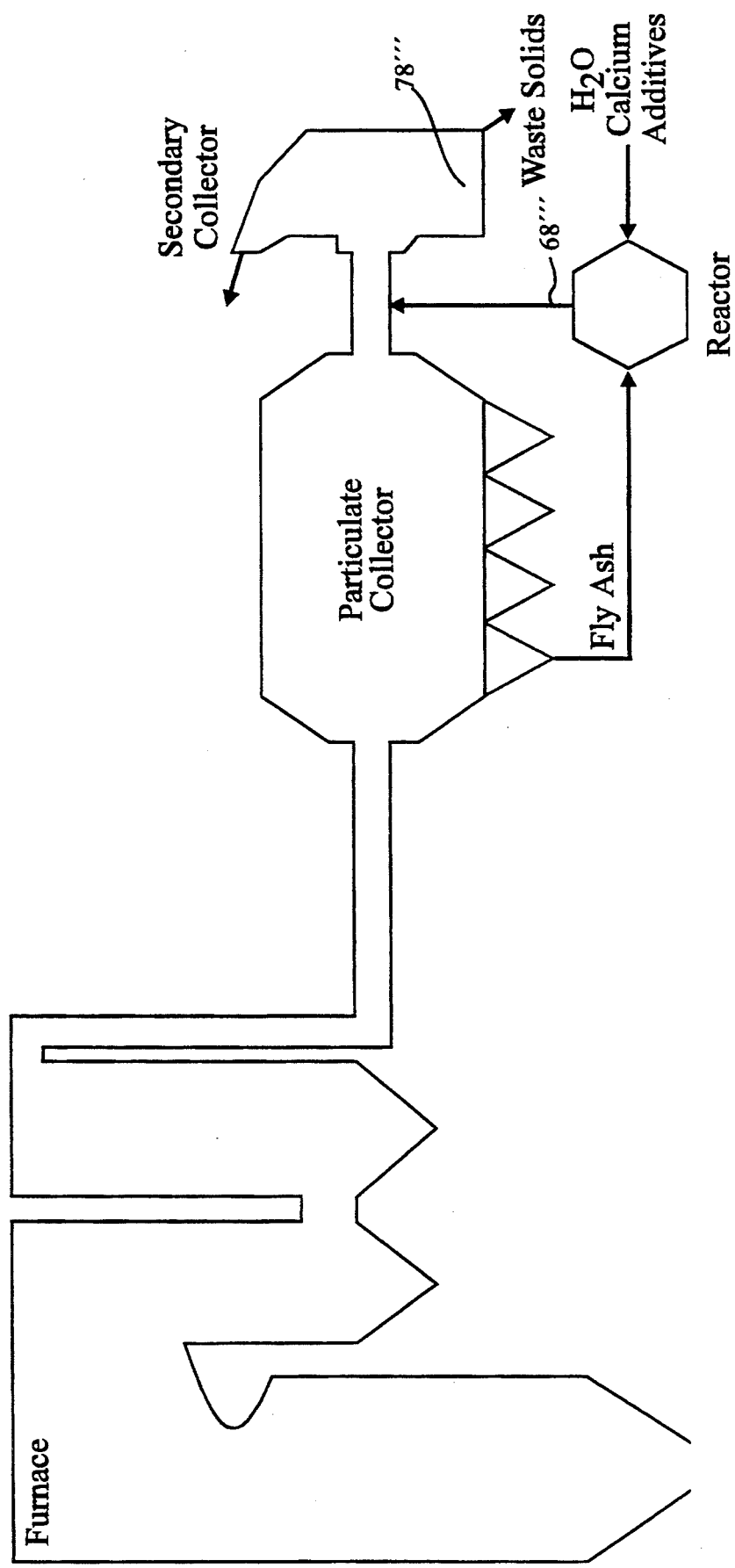
FIG. 11. Schematic diagram of a process using sorbent injection down stream of a primary particle collector.

4. Conventional Boiler or Furnace with Sorbent Injection After the Primary Particulate Collector but Upstream of a Secondary Collector (FIG. 11).

This process provides injection of the calcium silicates 68''' upstream of a secondary collector 78'''. The secondary collector 78''' may take the form of a baghouse which has been added for additional particulate/$SO_2$, control, or a wet scrubber where the calcium silicate 68''' lowers the $SO_2$ and $SO_3$ entering the scrubber and is further utilized as a slurry in the wet scrubber for further $SO_2$ and $SO_3$ removal.

5. Conventional Boiler or Furnace with no Calcium Addition (FIG. 8).

This process is similar to process 1, except no lime 60 is added. This assumes that the naturally occurring alkali in the flyash 62 is sufficient to form calcium silicates without external calcium addition.

6. Fluidized Bed Boiler with Calcium Injected Into Boiler (FIG. 9).

This process is similar to process 2, except that the furnace or boiler 72' is a type referred to as fluidized bed combustion. Such boilers traditionally have poor calcium utilization and would potentially benefit by higher $SO_2$ removal and significantly lower calcium consumption when the flyash calcium wastes are activated and reinjected into ductwork. Alternatively, the boiler might produce enough ash and calcium to provide silicates for clean-up of adjacent boiler systems as well.

7. Duct Sorbent Injection with In-Duct Reactor (FIG. 8).

The effectiveness of acid gas control is greatly dependent upon the contact time between sorbent and gases. Therefore, where the process provides a relatively short contact time, as in-duct injection followed by a mechanical or electrostatic precipitator 70, an in-duct reactor 80 may be added downstream of the sorbent 68 injection point. Typical reactors of this type include entrained, suspension, or fluid beds; mixers or turbulators; or simple duct expansions to increase gas and solids residence time.

The instant invention has been disclosed in connection with specific embodiments. However, it will be apparent to those skilled in the art that variations from the illustrated embodiments may be undertaken without departing from the spirit and scope of the invention.

What is claimed is:

1. A process for preparing a semi-dry, free-flowing powdery substance for use in reducing the level of acid components in a gas stream, the substance being prepared by a process that comprises:
    (a) preparing a mixture comprising a material containing calcium together with a material containing calcium-reactive silica, the calcium and silica being present in amounts sufficient to allow for formation of calcium silicate, the mixture being prepared by a method which comprises:
        (i) mixing the material containing calcium together with the material containing calcium-reactive silica;
        (ii) heating the mixture to a temperature above ambient to facilitate in the formation of the calcium silicate; and
        (iii) pressuring the mixture with water in the form of steam in a manner sufficient to allow for hydration of the calcium silicate; and
    (b) providing the mixture at a water content of between about 5% and about 50% by weight to provide the semi-dry, free-flowing powdery substance by using a method which comprises:
        (i) hydrating the mixture with a sufficient amount of water to produce an aqueous slurry; and
        (ii) drying the slurry by mixing it with spent solids.

2. A process for preparing a semi-dry, free-flowing powdery substance for use in reducing the level of acid components in a gas stream, the substance being prepared by a process that comprises:
    (a) preparing a mixture comprising a material containing calcium together with a material containing calcium-reactive silica, the calcium and silica being present in an amount sufficient to allow for formation of calcium silicate, the mixture being prepared by a method which comprises:
        (i) preparing an aqueous slurry comprising the material containing calcium together with the material containing calcium-reactive silica;
        (ii) heating the slurry to a temperature above ambient to facilitate the formation of the calcium silicate; and
        (iii) drying the slurry with spent solids to form the powdery substance; and
    (b) providing the mixture at a water content of between about 5% and about 50% by weight to provide the semi-dry, free-flowing powdery substance.

3. The process of claim 2, wherein the slurry is dried by mixing it with spent solids.

4. The process of claim 3, wherein between about 1 and 4 parts of spent solids are mixed with every part of slurry.

5. The process of claim 2, wherein the slurry is dried by filtering the slurry to remove a portion of water therefrom and mixing the slurry with spent solids.

* * * * *